US 11,412,535 B2

(12) United States Patent
Ye et al.

(10) Patent No.: US 11,412,535 B2
(45) Date of Patent: Aug. 9, 2022

(54) MULTI-SUBFRAME UPLINK SCHEDULING IN UNLICENSED SPECTRUM

(71) Applicant: Apple Inc., Cupertino, CA (US)

(72) Inventors: Qiaoyang Ye, San Jose, CA (US);
Hwan-Joon Kwon, Portland, OR (US);
Jeongho Jeon, San Jose, CA (US);
Abhijeet Bhorkar, Fremont, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/775,745

(22) PCT Filed: Mar. 29, 2016

(86) PCT No.: PCT/US2016/024612
§ 371 (c)(1),
(2) Date: May 11, 2018

(87) PCT Pub. No.: WO2017/099832
PCT Pub. Date: Jun. 15, 2017

(65) Prior Publication Data
US 2018/0352564 A1    Dec. 6, 2018

Related U.S. Application Data

(60) Provisional application No. 62/264,226, filed on Dec. 7, 2015.

(51) Int. Cl.
*H04W 72/12* (2009.01)
*H04W 72/14* (2009.01)
(Continued)

(52) U.S. Cl.
CPC ....... *H04W 72/1284* (2013.01); *H04L 5/0037* (2013.01); *H04L 5/0042* (2013.01);
(Continued)

(58) Field of Classification Search
CPC ................. H04W 72/14; H04W 16/14; H04W 72/042; H04W 72/1284; H04L 5/001
See application file for complete search history.

(56) References Cited

U.S. PATENT DOCUMENTS 9,300,393 B2 * 3/2016 Lin ....................... H04B 7/2606
2011/0274061 A1 * 11/2011 Li ......................... H04L 5/0053
370/329

(Continued)

FOREIGN PATENT DOCUMENTS

| CN | 108293256 | 7/2018 |
|---|---|---|
| WO | 2014169739 | 10/2014 |
| WO | WO-2014169739 A1 | 10/2014 |

OTHER PUBLICATIONS

"International Application Serial No. PCT US2016 024612, International Preliminary Report on Patentability dated Jun. 21, 2018", 11 pgs.
"International Application Serial No. PCT/US2016/024612, International Search Report dated Aug. 16, 2016", 4 pgs.
(Continued)

*Primary Examiner* — Mansour Oveissi
(74) *Attorney, Agent, or Firm* — Kowert, Hood, Munyon, Rankin & Goetzel, P.C.

(57) ABSTRACT

Systems, apparatus, user equipment (UE), evolved node B (eNB), computer readable media, and methods are described for scheduling of multiple uplink transmissions in unlicensed spectrum. One embodiment involves receiving, at an eNB, a first uplink scheduling request from a UE, scheduling a plurality of uplink subframes on the unlicensed channel in response to the first uplink scheduling request, and initiating transmission of a first subframe to the first UE in response to the scheduling of the plurality of uplink subframes, (Continued)

wherein the first subframe comprises one or more downlink control indicators (DCIs) allocating the plurality of uplink subframes to the first UE.

25 Claims, 11 Drawing Sheets

(51) Int. Cl.
*H04L 5/00* (2006.01)
*H04W 72/04* (2009.01)
*H04W 16/14* (2009.01)

(52) U.S. Cl.
CPC .......... *H04L 5/0044* (2013.01); *H04L 5/0053* (2013.01); *H04L 5/0082* (2013.01); *H04W 72/0413* (2013.01); *H04W 72/14* (2013.01); *H04L 5/001* (2013.01); *H04L 5/0094* (2013.01); *H04W 16/14* (2013.01); *H04W 72/042* (2013.01)

(56) References Cited

U.S. PATENT DOCUMENTS

| | | | |
|---|---|---|---|
| 2013/0051358 A1 | 2/2013 | Turtinen et al. | |
| 2013/0188516 A1 | 7/2013 | He et al. | |
| 2014/0307567 A1 | 10/2014 | Li et al. | |
| 2014/0314036 A1* | 10/2014 | Takeda | H04L 5/0048 370/329 |
| 2014/0334416 A1* | 11/2014 | Ko | H04L 5/0053 370/329 |
| 2014/0362780 A1* | 12/2014 | Malladi | H04W 72/1231 370/329 |
| 2015/0043434 A1* | 2/2015 | Yamada | H04W 72/0446 370/329 |
| 2015/0085794 A1 | 3/2015 | Chen et al. | |
| 2015/0131536 A1 | 5/2015 | Kaur et al. | |
| 2016/0066343 A1 | 3/2016 | Lin et al. | |
| 2016/0323883 A1* | 11/2016 | Wu | H04L 1/1819 |
| 2017/0111889 A1* | 4/2017 | Li | H04W 74/08 |
| 2017/0338932 A1* | 11/2017 | Lee | H04L 5/0092 |
| 2018/0175975 A1* | 6/2018 | Um | H04W 72/14 |

OTHER PUBLICATIONS

"International Application Serial No. PCT/US2016/024612, Written Opinion dated Aug. 16, 2016", 9 pgs.
"UL LBT for self-carrier scheduling", Intel Corporation, R1-155312, 3GPP TSG RAN WG1 Meeting #82bis, (Sep. 26, 2015).
Alcatel-Lucent, et al., "DCI Transmission for the DL Partial Subframe in LAA", R1-152994, 3GPP TSG RAN WG1 Meeting #81, (May 6, 2015).
"European Application Serial No. 16873495.2, Extended European Search Report dated Sep. 30, 2019", 15 pgs.
"European Application Serial No. 16873495.2, Partial Supplementary European Search Report dated Jun. 24, 2019", 15 pgs.
Nokia, "On DL transmission detection and UL subframe indication for LAA", 3GPP'draft; RI-155602, 3rd Generation Partnership Project (3GPP), Mobile Competence Centre ; 650, Route Des Lucioles ; F-06921 Sophia-Anti Polis Cedex France, (Oct. 4, 2015), 6 pgs.
Panasonic, "Considerations on Enhanced PDCCH", 3GPP Draft; RI-113130 E-Pdcch, 3rd Generation Partnership Project (3GPP), Mobile Competence Centre ; 650, Route Des Lucioles ; F-06921 Sophia-Anti Polis Cedex; France, (Oct. 4, 2011), 3 pgs.
Nokia Networks, "On DL transmission detection and UL subframe indication for LAA", 3GPP TSG RAN WG1, Meeting #82bis, R1-155602, Oct. 5-9, 2015, pp. 1-6.
Panasonic, "Considerations on Enhanced PDCCH", 3GPP TSG RAN WG1, Meeting #66bis, R1-113130, Oct. 10-14, 2011, pp. 1-3.
Office Action in European Application No. 16 873 495.2 dated May 25, 2021, 8 pgs.
CMCC: "Discussion on issues related to UL channel access for LAA", 3GPP Draft; R1-155785, 3rd Generation Partnership Project (3GPP), Mobile Competence Centre; 650, Route Des Lucioles; F-06921 Sophia-Antipolis Cedex; France, vol. RAN WG1, No. Malmo, Sweden; Oct. 5, 2015-Oct. 9, 2015 Oct. 4, 2015 (Oct. 4, 2015), XP051002592, 4 pgs.

* cited by examiner

MULTI-SUBFRAME UPLINK SCHEDULING IN UNLICENSED SPECTRUM

PRIORITY CLAIM

This application is a U.S. National Stage Filing under 35 U.S.C. 371 from International Application No. PCT/US2016/024612, filed Mar. 29, 2016 and published in English as WO 2017/099832 on Jun. 15, 2017, which claims the benefit of priority to U.S. Provisional Patent Application Ser. No. 62/264,226, filed on Dec. 7, 2015 and entitled "MULTI-SUBFRAME SCHEDULING FOR UL TRANSMISSION IN UNLICENSED SPECTRUM", each of which is incorporated herein by reference in its entirety.

TECHNICAL FIELD

Embodiments pertain to systems, methods, and component devices for wireless communications, and particularly to the integration of long term evolution (LTE), LTE-advanced, and other similar wireless communication systems with unlicensed frequencies.

BACKGROUND

LTE and LTE-advanced are standards for wireless communication of high-speed data for user equipment (UE) such as mobile telephones. In LTE-advanced and various wireless systems, carrier aggregation is a technology used by LTE-advanced systems where multiple carrier signals operating on different frequencies may be used to carry communications for a single UE, thus increasing the bandwidth available to a single device. In some systems, carrier aggregation may be used where one or more component carriers operate on unlicensed frequencies.

DETAILED DESCRIPTION

Embodiments relate to systems, devices, apparatus, assemblies, methods, and computer readable media to enhance wireless communications, and particularly to communication systems that operate using carriers in unlicensed frequencies. The following description and the drawings illustrate specific embodiments to enable those skilled in the art to practice them. Other embodiments can incorporate structural, logical, electrical, process, and other changes. Portions and features of some embodiments can be included in, or substituted for, those of other embodiments, and are intended to cover all available equivalents of the elements described.

Figure 1:
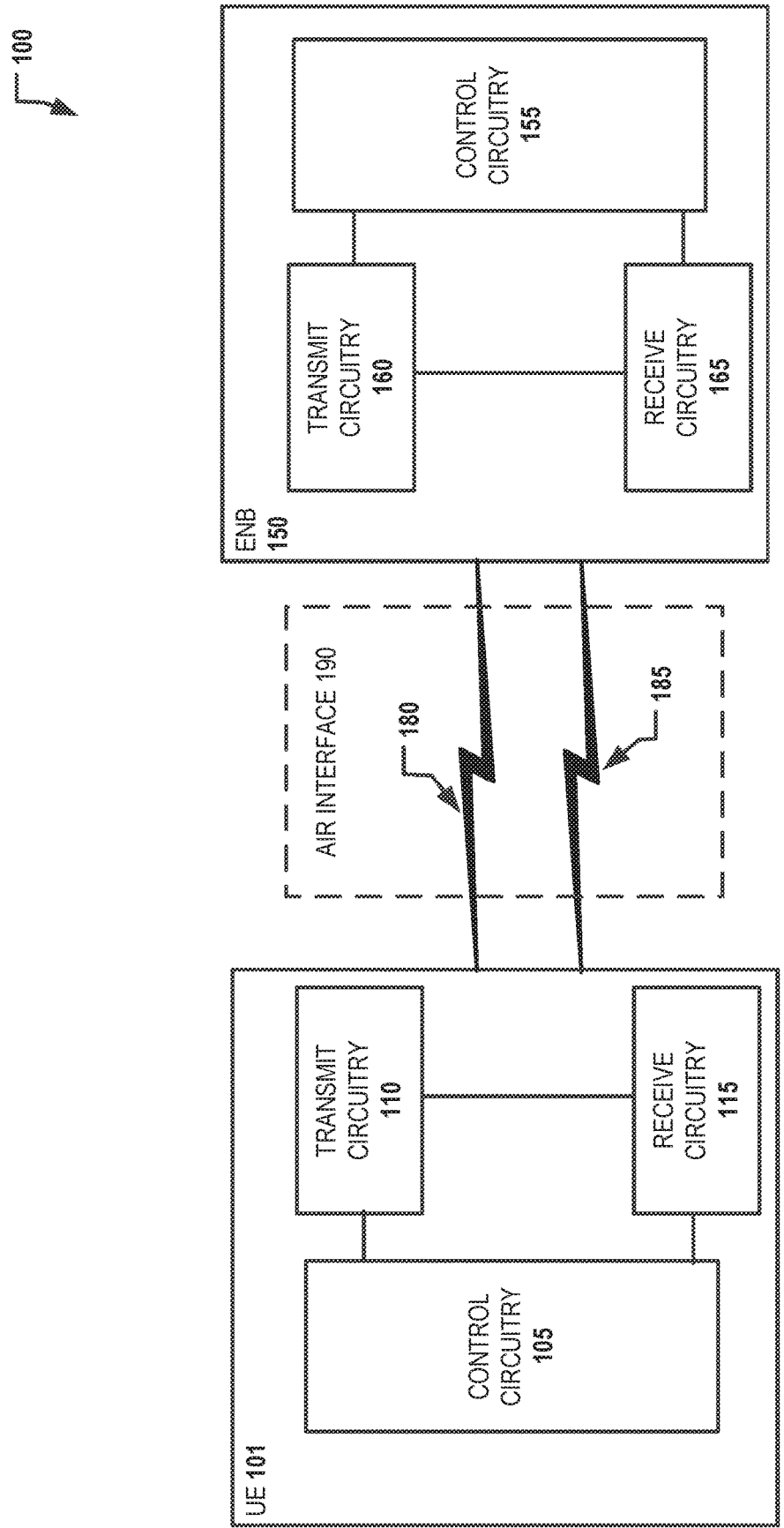
FIG. 1 is a block diagram of a system including an evoked node B (eNB) and user equipment (UE) that may operate, according to some embodiments described herein.

FIG. 1 illustrates a wireless network 100, in accordance with some embodiments. The wireless network 100 includes a UE 101 and an eNB 150 connected via an air interface 190. LTE 101 and eNB 150 communicate using a system that supports carrier aggregation, such that air interface 190 supports multiple frequency carriers, shown as component carrier 180 and component carrier 185. Although two component carriers 180, 185 are illustrated, various embodiments may include any number of one or more component carriers 180, 185.

Additionally, in various embodiments described herein, at least one of the carriers of air interface 190 comprises a carrier operating in an unlicensed frequency, referred to herein as an unlicensed carrier. An unlicensed carrier or unlicensed frequency refers to system operation in a range of radio frequencies that are not exclusively set aside for the use of the system. Some frequency ranges, for example, may be used by communication systems operating under different communication standards, such as a frequency band that is used by both Institute of Electronic and Electrical Engineers (IEEE) 802.11 standards (e.g. "WiFi") and third generation partnership (3GPP) standards. By contrast, a licensed channel or licensed spectrum operates under a particular system, with limited concern that other unexpected signals operating on different standard configurations will be present. Some embodiment systems described herein may operate using both unlicensed and licensed carriers, while other systems may operate using only unlicensed carriers.

As discussed below, when a system operates in an unlicensed spectrum, rules and operations for verifying that the unlicensed channels are available provide additional overhead and system operational elements that are not present in licensed channels. The sharing of a channel may be referred to as fair coexistence, where different systems operate to use an unlicensed or shared channel while limiting both interference and direct integration with the other systems operating on different standards.

Long term evolution (LTE) cellular communications, for example, historically operate with a centrally managed system designed to operate in a licensed spectrum for efficient resource usage. Operating with such centrally managed use within unlicensed channels, where systems which are not centrally controlled that use different channel access mechanisms than legacy LTE may be present, carries significant risk of direct interference. Coexistence mechanisms described herein enable LTE, LTE-advanced, and communications systems building on or similar to LTE systems to coexist with other technologies such as WiFi in shared unlicensed frequency bands (e.g. unlicensed channels.) Flexible carrier aggregation (CA) frameworks within systems such as LTE-Advanced may thus operate in various ways to use unlicensed spectrum. This may include uplink transmission in unlicensed spectrum. In some environment, a 5 Gigahertz band is particularly available as unlicensed spectrum governed by Unlicensed National Information Infrastructure (U-NII) rules.

Embodiments described herein for coexistence may operate within the wireless network 100. In wireless network 100, the UE 101 and any other UE in the system may be, for example, laptop computers, smartphones, tablet computers, printers, machine-type devices such as smart meters or specialized devices for healthcare monitoring, remote security surveillance, an intelligent transportation system, or any other wireless devices with or without a user interface. The eNB 150 provides the UE 101 network connectivity to a broader network (not shown in FIG. 1) such as network 960 of FIG. 9. This UE 101 connectivity is provided via the air interface 190 in an eNB service area provided by the eNB 150. In some embodiments, such a broader network may be a wide area network operated by a cellular network provider, or may be the Internet. Each eNB service area associated with the eNB 150 is supported by antennas integrated with the eNB 150. The service areas are divided into a number of sectors associated with certain antennas. Such sectors may be physically associated with fixed antennas or may be assigned to a physical area with tunable antennas or antenna settings adjustable in a beamforming process used to direct a signal to a particular sector. One embodiment of the eNB 150, for example, includes three sectors each covering a 120 degree area with an array of antennas directed to each sector to provide 360 degree coverage around the eNB 150.

The UE 101 includes control circuitry 105 coupled with transmit circuitry 110 and receive circuitry 115. The transmit circuitry 110 and receive circuitry 115 may each be coupled with one or more antennas. The control circuitry 105 may be adapted to perform operations associated with wireless communications using carrier aggregation. The transmit circuitry 110 and receive circuitry 115 may be adapted to transmit and receive data, respectively. The control circuitry 105 may be adapted or configured to perform various operations such as those described elsewhere in this disclosure related to a UE 101. The transmit circuitry 110 may transmit a plurality of multiplexed uplink physical channels. The plurality of uplink physical channels may be multiplexed according to time division multiplexing (TDM) or frequency division multiplexing (FDM) along with carrier aggregation. The transmit circuitry 110 may be configured to receive block data from the control circuitry 105 for transmission across the air interface 190. Similarly, the receive circuitry 115 may receive a plurality of multiplexed downlink physical channels from the air interface 190 and relay the physical channels to the control circuitry 105. The uplink and downlink physical channels may be multiplexed according to FDM. The transmit circuitry 110 and the receive circuitry 115 may transmit and receive both control data and content data (e.g. messages, images, video, et cetera) structured within data blocks that are carried by the physical channels.

FIG. 1 also illustrates the eNB 150, in accordance with various embodiments. The eNB 150 circuitry may include control circuitry 155 coupled with transmit circuitry 160 and receive circuitry 165. The transmit circuitry 160 and receive circuitry 165 may each be coupled with one or more antennas that may be used to enable communications via the air interface 190.

The control circuitry 155 may be adapted to perform operations for managing channels and component carriers 180, 185 used with various UEs. The transmit circuitry 160 and receive circuitry 165 may be adapted to transmit and receive data, respectively, to any UE 101 connected to eNB 150. The transmit circuitry 160 may transmit downlink physical channels comprised of a plurality of downlink subframes. The receive circuitry 165 may receive a plurality of uplink physical channels from various UEs including UE 101. The plurality of uplink physical channels may be multiplexed according to FDM in addition to the use of carrier aggregation.

As mentioned above, the communications across air interface 190 may use carrier aggregation, where multiple different component carriers 180, 185 can be aggregated to carry information between UE 101 and eNB 150. Such component carriers 180, 185 may have different bandwidths, and may be used for uplink communications from UE 101 to eNB 150, downlink communications from eNB 150 to UE 101, or both. Such component carriers 180, 185 may cover similar areas, or may cover different but overlapping sectors. The radio resource control (RRC) connection is handled by only one of the component carrier cells, which may be referred to as the primary component carrier, with the other component carriers referred to as secondary component carriers. In some embodiments, the primary component carrier may be operating in a licensed band to provide efficient and conflict-free communications. This primary channel may be used for scheduling other channels including unlicensed channels as described below. In other embodiments, the primary channel may operate in an unlicensed band.

In various communication systems, including some implementations of FIG. 1, resources in time and frequency domains are dynamically shared among multiple UEs, such as UE 101, served by the same eNB, such as eNB 150. The resource sharing method may be based on the orthogonal allocation of time-frequency resources to different UEs. Orthogonal resource allocation is beneficial in that it avoids interference between intra-cell transmissions. To achieve orthogonal resource allocation, a scheduler in circuitry of eNB 150 assigns appropriate time-frequency resources to different UEs. In some systems, one operation of such a scheduler is dynamic scheduling, wherein an eNB 150 transmits scheduling information every 1 millisecond (ms) and the scheduling information is valid only for the specific single subframe. Another possible scheduling operation is semi-persistent scheduling (SPS) where semi-static scheduling information is signaled in advance to reduce the control overhead and the scheduling configuration is valid for more than one subframe (e.g. more than one ms). Dynamic scheduling provides benefits for scheduling services with bursts traffic and dynamic size (e.g. transmission control protocol (TCP) traffic) while SPS is more efficient for scheduling services such as voice over internet protocol with periodic traffic and semi-static data sizes.

Uplink scheduling information, including which UEs are scheduled for communication, and the corresponding modulation and coding scheme as well as the resource assigned for a transmission, in some LTE systems is contained in Downlink Control Information (DCI) in formats 0 or 4. In other words, the uplink transmissions of UE 101 in various LTE systems may be controlled by the eNB 150 using DCI format 0/4 communications. Some such LTE systems operate where uplink scheduling information transmitted in one subframe (e.g. subframe n) indicates the scheduling of an allocation for an uplink transmission from UE 101 to eNB 150 in a subframe that is a fixed delay later (e.g. subframe n+4). In various other embodiments, other fixed delays or a dynamic adjustable delay may be used.

In some embodiments of LTE or similar systems, unlicensed spectrum may be used primarily for offloading from licensed carriers. In such systems, unlicensed spectrum may be used for transmission of large packets of data. In such embodiments, a UE such as UE 101 is expected to request uplink transmissions over multiple subframes of standard LTE operation. A fixed request and response, particularly in the context of shared bandwidth requiring coexistence operations, is inefficient, particularly when there is no associated downlink data that may be transmitted on the channel. Separate scheduling requests may thus result in excessive control overhead and negative impacts on other systems attempting to share the unlicensed spectrum. In various embodiments described herein, downlink control overhead is reduced and coexistence is improved by scheduling multiple subframes using one request (e.g. one DCI or one subframe including multiple DCIs) to schedule multiple uplink subframes.

Figure 2:
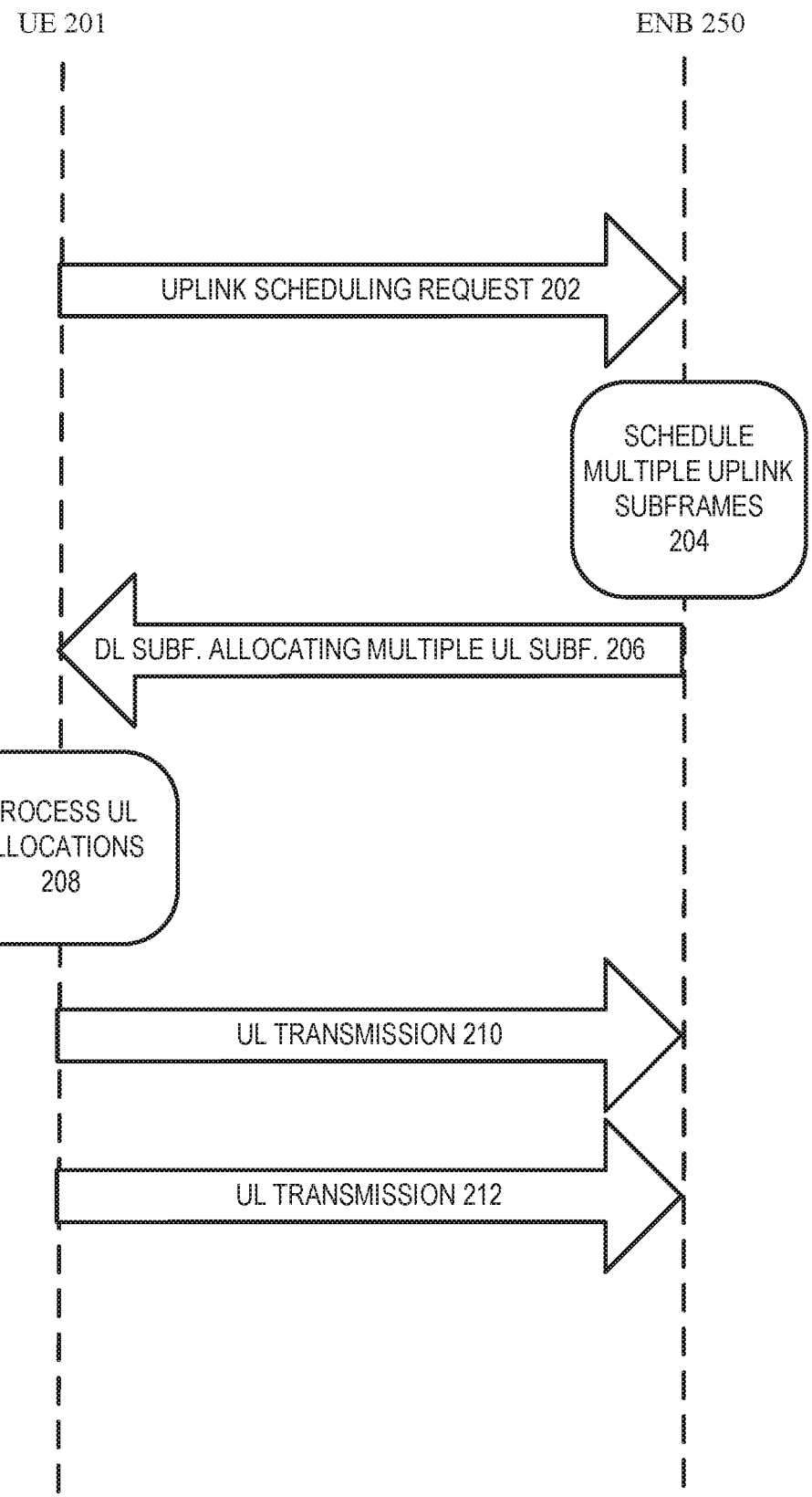
FIG. 2 illustrates aspects of multi-subframe uplink scheduling in unlicensed spectrum, according to some embodiments.

FIG. 2 then describes one potential method for an eNB communicating with a UE to utilize an unlicensed channel. FIG. 2 shows various communications between a UE 201 which may be similar to UE 101 and an eNB 250 which may be similar to eNB 150. In various embodiments, different networks with different structures or additional devices may be used. In various implementations, different channels may be used for different communications (e.g. 202, 206, 210, and 212), but any uplink transmissions scheduled are transmitted on an unlicensed carrier.

In the embodiment of FIG. 2, uplink scheduling request 202 is communicated from UE 201 to eNB 250. As mentioned above, the uplink scheduling request 202 will be associated with multiple requested uplink subframes. ENB 250 receives the uplink scheduling request 202, and processes this request in an operation to schedule multiple uplink subframes 204. This processing in eNB 250 may be performed by various control circuitry 155 or other circuitry described with respect to FIG. 1 or 10. This results in the generation of a downlink subframe allocating multiple uplink subframes 206, which is communicated from eNB 250 to UE 201. The UE 201 then processes the downlink subframe allocating multiple uplink subframes 206 using various circuitry similarly described in FIG. 1 or 10 in an operation to process uplink allocation 208. After this allocation is processed by UE 201, the UE 201 initiates multiple uplink transmissions, shown as uplink transmission 210 and uplink transmission 212. In various embodiments, various numbers of two or more uplink transmissions may be transmitted based on subframes allocated by a single downlink subframe allocating multiple uplink subframes 206. In various embodiments, coexistence operations (e.g. listen before talk) may be performed at various points in this process. For example, UE 201 may listen before taking control of the unlicensed channel for uplink scheduling request 202 with all subsequent communications occurring while the unlicensed channel is held for UE 201 and released following the final uplink transmission 212 (or any such additional uplink transmission.) In various embodiments, the DCI(s) for multiple uplink subframe scheduling can schedule different uplink subframes to different UEs. In other embodiments, uplink scheduling request 202 may occur on an unlicensed channel, with a listen before talk operation occurring during processing of uplink allocation 208 on the unlicensed channel and before uplink transmission 210. In other embodiments, other such coexistence may be used within the structure described with respect to FIG. 2.

The downlink subframe allocating multiple uplink subframes 206 may be structured in different ways for different embodiments. In some embodiments, this communication includes a modified DCI designed for multi-subframe scheduling, which includes indication information of which subframes are to be jointly scheduled. In some embodiments, additional fields are added to existing DCI formats (e.g. DCI format 0 or 4) to carry indication information of which uplink subframes are to be scheduled. If the scheduling configuration for the multiple subframes to be scheduled by the DCI is different, additional fields are appended to the DCI in some embodiments to carry the different scheduling configuration information.

Some embodiments may also include a newly defined Radio Network Temporary Identifier (RNTI) to identify the new DCI. In other embodiments, existing cell RNTI (C-RNTI) structures are used to scramble Cyclic Redundancy Check (CRC) parity bits and to communicate information about a DCI format for scheduling multiple subframes to a UE.

In some embodiments, the downlink subframe allocating multiple uplink subframes 206 may include a single DCI, while in others, multiple DCIs, each of which may include the scheduling information for single or multiple subframes, can be multiplexed within the single DL subframe.

Further, the downlink subframe allocating multiple uplink subframes 206 uses different resource elements (REs) in different embodiments. The following REs may be used in various combinations in different embodiments for the transmission of DCI information containing multi-subframe scheduling information. In some embodiments, existing control channel regions for a Physical Downlink Control Channel (PDCCH) is used. This includes the first three orthogonal frequency division multiplexed (OFDM) symbols in some embodiments. In other embodiments, control channel regions of the PDCCH can be extended to more than three OFDM symbols for the DCI or DCIs.

In some embodiments, a Physical Control Format Indicator Channel (PCFICH) may assist with enabling the DCI transmission. In one embodiment, an existing PCFICH structure may be re-used if there are in-total at most four possible control regions associated with the DCI transmission. Other embodiments may include other numbers of control regions in different channel formats. In another embodiment, a PCFICH is modified if a region for carrying PDCCH is extended to more than four control region options. More bits may be needed in such embodiments to indicate Control Format Indicator (CFI) values. In one example embodiment, a codeword length for a PCFICH may use a standard number of bits (e.g. 32 bits) by modifying a code rate. In other embodiments, the PCFICH codeword length is extended and additional REs are used for PCFICH transmission.

In some embodiments, the DCI or DCIs in the downlink subframe allocating multiple uplink subframes 206 use an enhanced PDCCH (EPDCCH).

Additionally, as mentioned above, various embodiments may operate with a delay during the UE 201 operation to process uplink allocations 208 that occur between receipt of the downlink subframe allocating multiple uplink subframes 206 and UE 201 initiating the first uplink transmission 210 of the multiple allocated uplink subframes associated with uplink transmission 210, uplink transmission 212, and any other such allocated uplink subframes for transmission to eNB 250 as part of a single allocation.

In some embodiments, a standard LTE system delay of 4 ms may be used. In other systems, depending on the circuitry of UE 201 or other system configurations, the delay between transmission of the DCI or DCIs allocating multiple subframes from eNB and uplink transmission 210 can be shortened to values less than 4 ms (e.g. 1 ms or 2 ms). In various embodiments, this delay between transmission of the DCI or DCIs in the downlink subframe allocating multiple uplink subframes 206 and uplink transmission 210 is configurable. The configuration may be performed in various ways in different embodiments. In some embodiments, L1 or L2 signaling may be used. In other embodiments, radio resource control (RRC) signaling may be used to configure this delay. In further embodiments, other higher layer signaling may be used. In some embodiments, multiple different types of signaling may be used to configure this delay.

Figure 3:
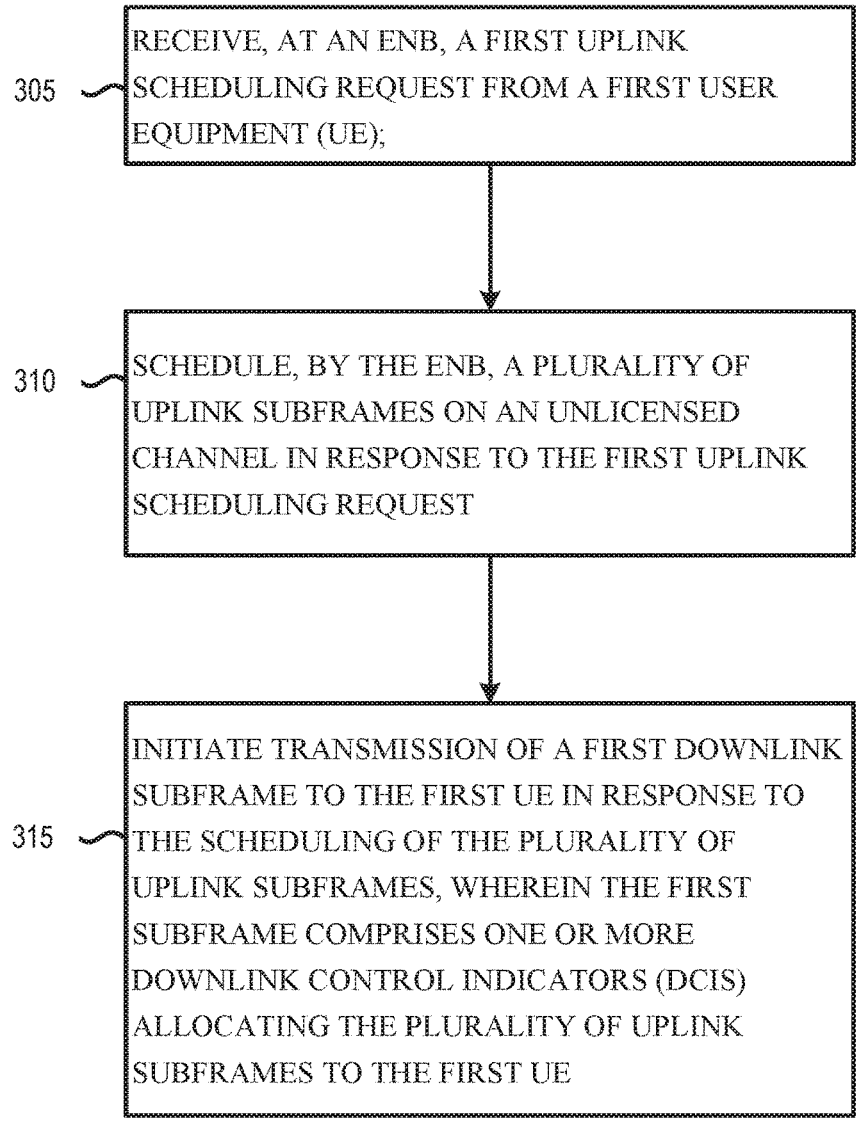
FIG. 3 describes an example method for multi-subframe uplink scheduling in unlicensed spectrum, according to some embodiments.

FIG. 3 then describes a method 300 for multi-subframe uplink scheduling in unlicensed spectrum in accordance with various embodiments. In some embodiments, the method 300 may be performed by an eNB such as eNB 150 or 250. In other embodiments, method 300 may be implemented as instructions in a computer readable media that configure an eNB such as eNB 250 to perform method 300 when the instructions are executed by one or more processors of the eNB 250. In other embodiments, other such implementations may be used for method 300. For the purposes of illustration, method 300 is described in the context of FIG. 1. Any implementations discussed herein may be used for method 300 in various embodiments.

Method 300 begins with operation 305 and eNB 150 receiving a first uplink scheduling request 202 from a first UE 101. This may, for example, be a data packed transmitted from UE 101 to eNB 150 using a Physical Uplink Control Channel (PUCCH) or using any other such system resource (e.g., PRACH). In some embodiments, this uplink scheduling request is similar to uplink scheduling request 202.

In operation 310, the eNB 150 schedules a plurality of uplink subframes on the unlicensed channel in response to the first uplink scheduling request 202 from operation 305. In various implementations, this processing may be performed by baseband circuitry of eNB 150 or any other control circuitry 155 of eNB 150. This operation may manage competing resource requests from multiple UEs including UE 101 to allocate a portion of the resources available to eNB 150 to UE 101. In various embodiments, the eNB 150 may schedule multiple uplink subframes, with different subframes for different UEs.

After the circuitry of eNB 150 has identified the resources to allocate to UE 101, eNB 150 initiates transmission of a first subframe to the first UE 101 as part of operation 315 in response to the scheduling of the plurality of uplink subframes in operation 310. The first subframe comprises one or more DCIs allocating the plurality of uplink subframes to the first UE 101 or set of different UEs including UE 101. In other embodiments, multiple subframes are scheduled for different UEs.

Figure 4:
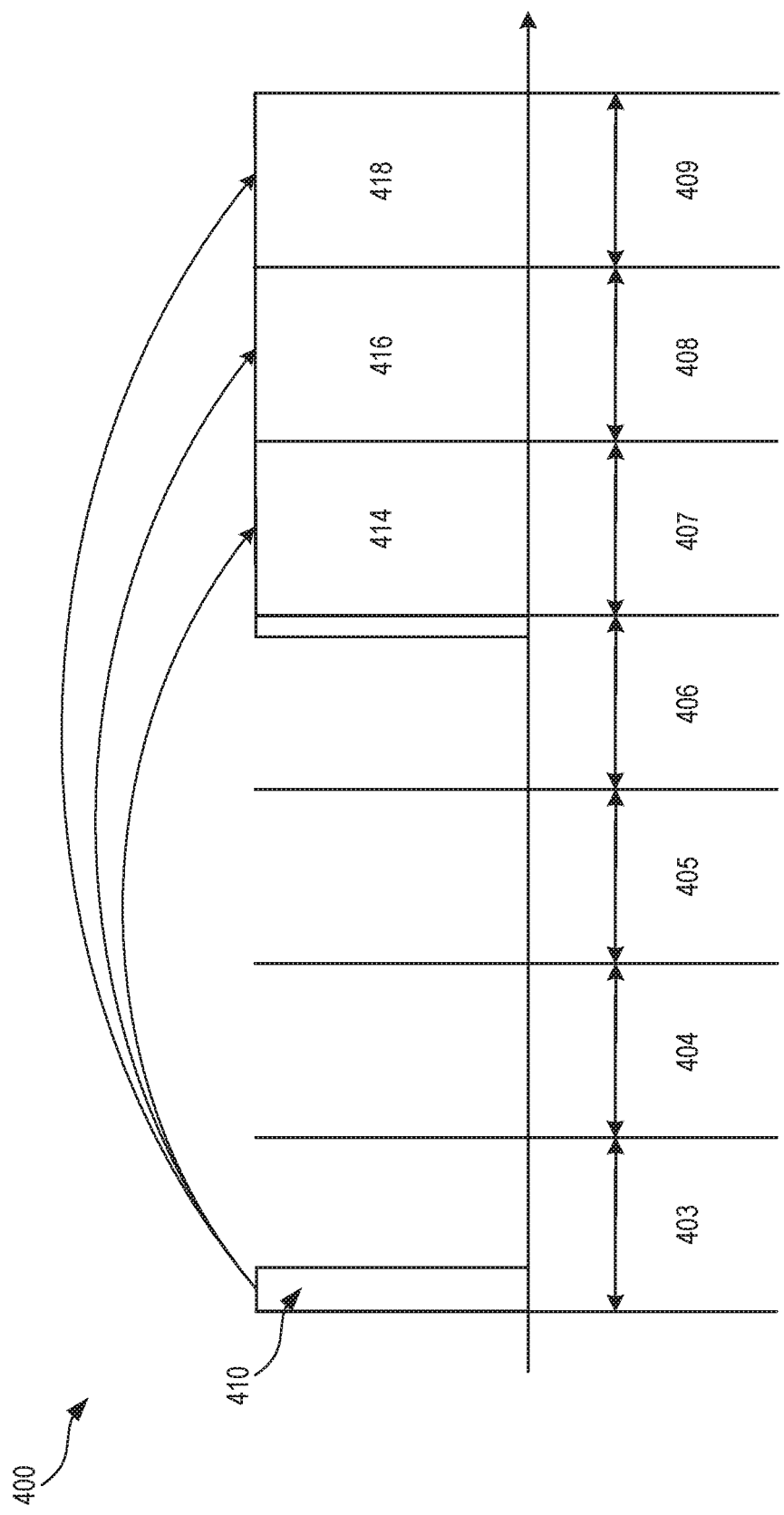
FIG. 4 illustrates aspects of multi-subframe uplink scheduling in unlicensed spectrum, according to some embodiments.

FIG. 4 then illustrates aspects of multi-subframe uplink scheduling in unlicensed spectrum, according to some embodiments. As mentioned above, in different embodiments, the subframe initiated to the UE 101 by an eNB 150 may allocate a plurality of uplink subframes using a single DCI or multiple DCIs. FIG. 4 illustrates the use of a single DCI 410 in subframe 403 to allocate a plurality of subframes out of a timeline of subframes 403-409 to a UE 101. In the embodiment of FIG. 4, data of uplink transmissions 414, 416, and 418 is scheduled in corresponding subframes 407, 408, and 409 by DCI 410.

Figure 5:
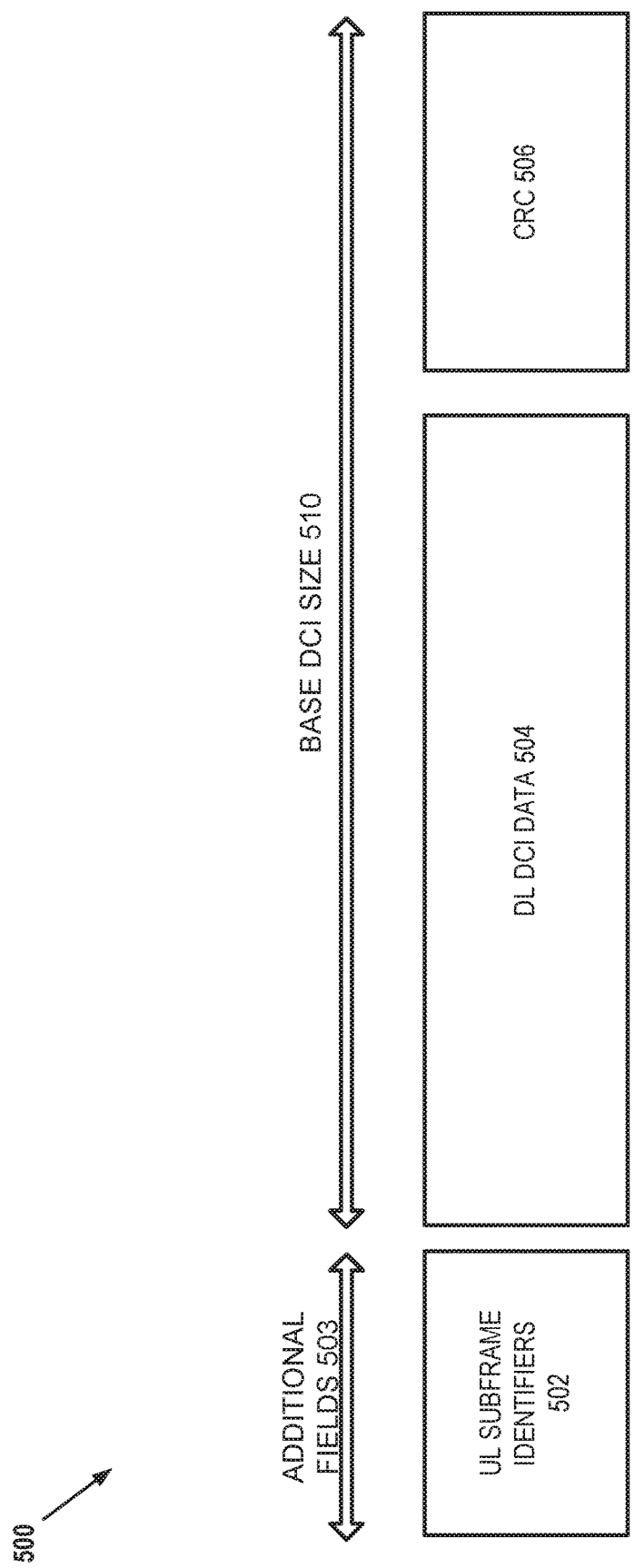
FIG. 5 illustrates aspects of example downlink control information (DCI) that may be used for multi-subframe uplink scheduling in unlicensed spectrum, according to some embodiments.

FIG. 5 illustrates one example embodiment of a new DCI format 500 that may be used for a DCI transmission to allocate multiple subframes such as DCI 410. DCI format 500 includes a base DCI size 510 that includes downlink DCI data 504 and CRC 506 which is scrambled by a C-RNTI. DCI format 500 then further includes an additional fields 503 including uplink subframe identifiers 502. These additional fields 503 are, in some embodiments, added to existing DCI format structures of a base DCI size 510 matching a standard DCI format 0 or format 4 structure. The additional fields 503 carry the indication information of which uplink subframes are to be scheduled for a UE 101. In some embodiments, a subframe index that is scheduled by the DCI 410 can be indicated as an offset with respect to the subframe containing the DCI 410. For example, in some embodiments, uplink subframe identifiers 502 for transmissions similar to the embodiment of FIG. 4 may include an indication that the allocated subframes are the three subframes which begin four subframes after transmission of the DCI 410. In the example embodiment of FIG. 4, a four subframe delay is present between subframe 403 containing DCI 410 and subframe 7 containing the initial uplink transmission 414, and uplink transmissions 414, 416, and 418 take the three subframes following this four subframe delay. As mentioned above, this delay is structured differently in other embodiments. Other example embodiments may include a delay of one subframe, two subframes, three subframes, five subframes, or any other such delay. Additionally, in other embodiments, the allocated uplink subframes may be identified directly using subframe identifiers rather than by the offset described above.

Additionally, DCI format 500 includes CRC 506. In DCI format 500, CRC 506 is scrambled by an existing C-RNTI that is re-used to scramble the CRC 506. In such embodiments, the identification of the new DCI format 500 from existing other DCI formats can be based on the number of bits contained in the DCI message if this number is different from the number of bits in other DCI formats. In some embodiments, the search space of the new DCI 410 can be a UE-specific search space or UE group search space (for the UEs that are to be scheduled). In other embodiments, rather than CRC 506 being scrambled by a pre-existing C-RNTI, a new RNTI specifically associated with multi-subframe scheduling may be used. In such embodiments, this new MS-RNTI may be used to identify the new DCI format which is used to allocate the subframes for uplink transmissions 414-418.

In a DCI format such as DCI format 500, where multiple subframes are scheduled using a single DCI 410, multiple subframes with the same configuration can be scheduled via one DCI. In some embodiments, subframes with different configurations use different DCIs. This is because in embodiments similar to the embodiment of DCI format 500, the downlink DCI data 504 field in the DCI format 500 which carries information such as hybrid automatic repeat request process numbers, new data indication information, redundancy version indication information, power control information, and modulation and coding scheme (MCS) information is the same as existing DCI format 0 or 4 that schedules only one subframe. Thus, in such embodiments, the configurations are the same for subframes scheduled by the same DCI 410. In other embodiments, a DCI format 500 may have additional fields 503 with added numbers of bits to carry different configurations for different subframes within a single DCI 410. Such embodiments will not have a base DCI size 510 which includes downlink DCI data 504 fields with CRC 506 but will instead have a larger DCI size in addition to any added fields identifying the allocated subframes.

Figure 6:
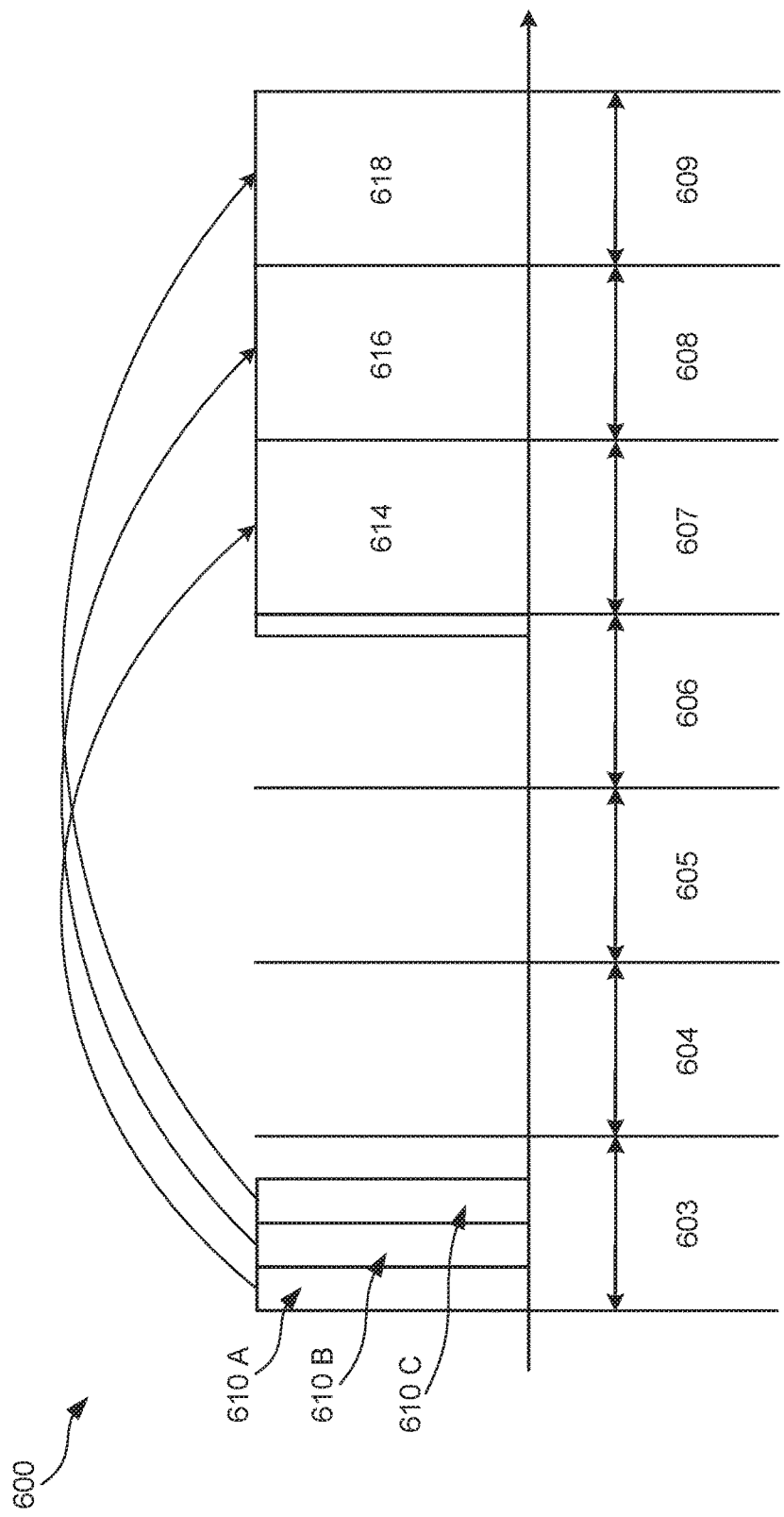
FIG. 6 illustrates aspects of multi-subframe uplink scheduling in unlicensed spectrum, according to some embodiments.

FIG. 6 then describes another embodiment where a plurality of DCIs are used to schedule a plurality of uplink subframes. FIG. 6 shows a timeline of available subframes 603-609 for a system including an eNB 150 communicating with a UE 101. In the embodiment of FIG. 6, separate DCIs 610A, 610B, and 610C within subframe 603 are communicated from the eNB to the UE to schedule subframes 607-609 for uplink transmissions 614, 616, and 618. Each DCI schedules a single uplink transmission for a different subframe, so that DCI 610A schedules uplink transmission 614 for subframe 607, DCI 610B schedules uplink transmission 616 for subframe 608, and DCI 610C schedules uplink transmission 618 for subframe 609. As shown, DCIs 610A-C are multiplexed within single subframe 603. DCIs 610A-C are, in some embodiments, in a standard DCI format 0 or 4. In other embodiments, custom DCI formats structured to be multiplexed into a single subframe may be used. In various embodiments, such multiple DCIs may be multiplexed within a subframe using any combination of time and/or frequency division multiplexing.

Additionally, while FIG. 4 shows a single DCI scheduling all of the uplink subframes, and FIG. 6 illustrates each uplink subframe scheduled by a single DCI, in other embodiments, multiple DCIs may be included in a single downlink subframe from an eNB, and each of these DCIs may schedule multiple uplink subframes. For example, in one embodiment, four uplink subframes may be scheduled by two DCIs within a single subframe from an eNB to a UE. In such an embodiment, each DCI may schedule two of the four uplink subframes. In such an embodiment, both of the DCIs may have the same format. In other embodiments, a single downlink subframe allocating multiple uplink subframes to a UE from an eNB may include DCIs with different formats. Such an embodiment may, for example, include a single subframe that includes a first DCI having DCI format 500, and a second DCI having a standard DCI format 0 or 4. In other embodiments, additional numbers of DCIs may be present in a single subframe having any combination of DCIs with shared or different formats. For example, two DCIs may have DCI format 500, and one DCI may have a standard DCI format or any other such format, as long as space is available within the subframe.

Figure 7:
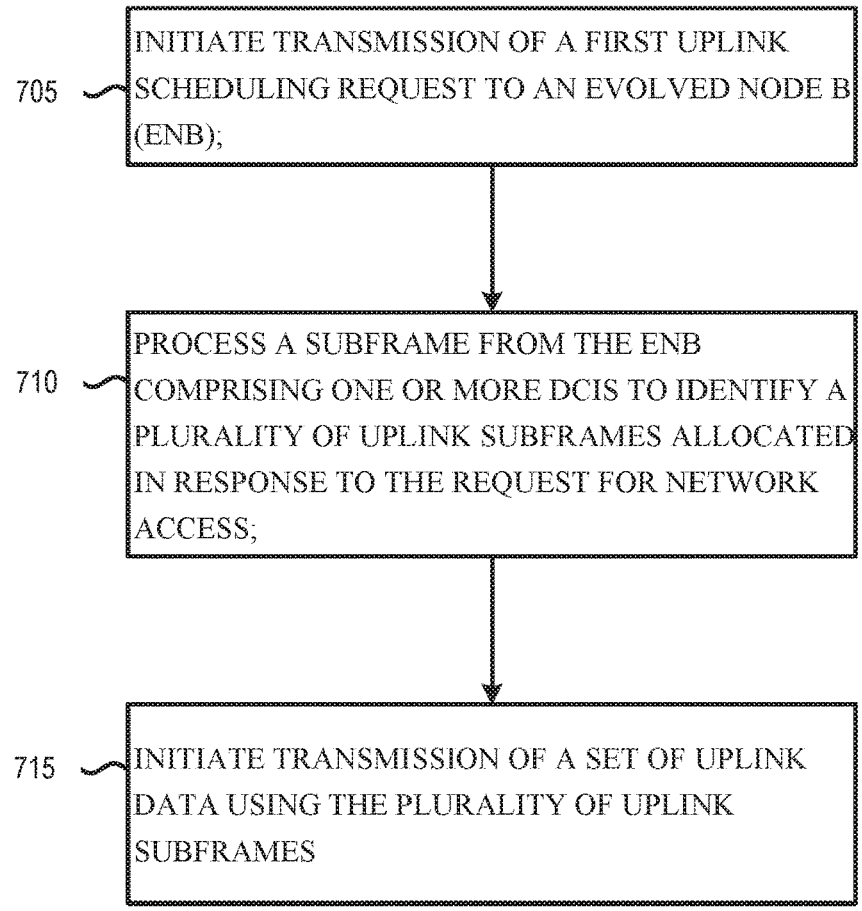
FIG. 7 describes an example method for multi-subframe uplink scheduling in unlicensed spectrum, according to some embodiments.

FIG. 7 then illustrates a method 700 that may be performed by a UE. Method 700 is a method for multi-subframe uplink scheduling in unlicensed spectrum, in accordance with various embodiments. In some embodiments, the method 700 may be performed by a UE such as UE 101, 201, 802, 804, 806 or any other such device. In other embodiments, method 700 is implemented as instructions in a computer readable media that configure a UE to perform method 700 when the instructions are executed by one or more processors of the eNB. In other embodiments, other such implementations may be used for method 700. For the purposes of illustration, method 700 is described in the context of FIG. 1. Any implementations discussed herein may be used for method 700 in various embodiments.

Method 700 begins with UE 101 initiating transmission in operation 705 of a first uplink scheduling request to eNB 150. The scheduling request may be initiated in response to a request for network resources or data by application circuitry or any other control circuitry 105 of UE 101. After transmit circuitry 110 successfully transmits the scheduling request to eNB 150, then a response is received by receive circuitry 115. In operation 710, circuitry of UE 101 processes a subframe from the eNB 150 comprising one or more DCIs to identify a plurality of uplink subframes allocated in response to the request for network access from operation 705. In some embodiments, signaling may be used to configure circuitry of UE 101 to identify various DCI formats and subframe transmissions used to schedule multiple uplink subframes in a single downlink subframe transmission. Such signaling may, for example, be L1/L2 signaling, RRC signaling, or any other such signaling used to set scheduling delays or communicate DCI format information to UE 101. This information may then be used by UE 101 in operation 710 to process the received subframe including the one or more DCIs. In processing the received subframe, the UE 101 may identify the DCI information from a variety of resource elements. As mentioned above, in some embodiments, existing control channel regions of a PDCCH (e.g. the first three OFDM symbols) include the one or more DCI transmissions, in some embodiments. In other embodiments, the UE 101 receives the one or more DCIs from an extended control channel region of the PDCCH that includes more than three OFDM symbols. In some such embodiments, an associated PCFICH is adjusted as described above if needed. For example, in one embodiment, if the region for carrying PDCCH is extended from three options (e.g. one, two or three OFDM symbols) to four options (e.g. one, two, three, or four OFDM symbols) the existing PCFICH can be re-used, with the reserved value for a CFI used to indicate the additional option for the control channel region (e.g. four OFDM symbols). In another embodiment, if the region for carrying PDCCH is extended to more than four options (e.g. one, two, three, four, or five OFDM symbols), the PCFICH is modified to enable the indication for the different control regions (e.g. more bits are used to indicate CFI values). In some embodiments, the code rate is modified, while in others the codeword length is modified.

In different embodiments, the delay time allocated for processing the allocation by UE 101 in operation 710 may vary. In some embodiments, the delay between the DCI received in the allocation subframe from eNB and the first allocated uplink subframe may be set as a time (e.g. 4 ms, 3 ms, 2 ms, 0.5 ms, etcetera) or a frame schedule (e.g. 5 subframes, 3 subframes, one subframe, etcetera). In other embodiments, this delay may be configurable rather than set, and the delay may be set by any acceptable signaling, such as L1/L2 signaling, RRC signaling, or any other higher layer signaling.

When the one or more DCIs are successfully processed, the UE 101 identifies the subframes allocated, and transmits data to eNB 150 in operation 715 using the allocated subframes. The scheduled UEs first perform LBT prior to the scheduled uplink subframes and if the channel is sensed to be idle, the UEs would start transmitting.

Figure 8:
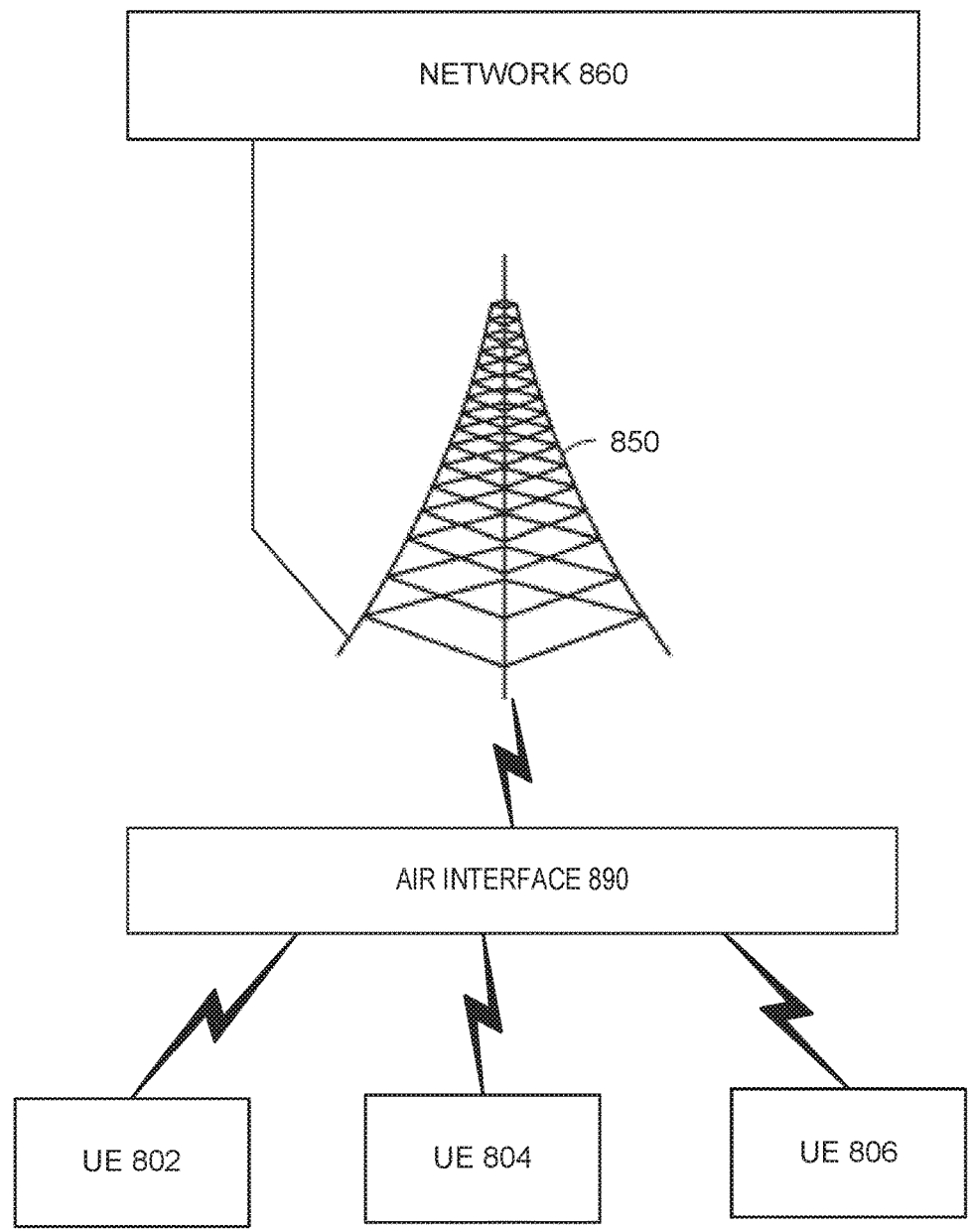
FIG. 8 is a block diagram of a system including eNB and multiple UEs that may be used with some embodiments described herein.

FIG. 8 is a block diagram of a system 800 including eNB and multiple UEs that may be used with some embodiments described herein. FIG. 8 describes eNB 850 coupled to UEs 802, 804, and 806 via air interface 890. eNB 850 provides the UEs 802-806 with access to network 860, which may be a wide area network or the Internet. Any of these elements may be similar to corresponding elements described above. In some embodiments, eNB 850 sends an uplink grant for a specific set of subframes on the unlicensed channel to a particular UE. In some embodiments, different UEs may simultaneously receive uplink grants for a plurality of different subframes via any method described herein. In order to access the unlicensed channel, UEs 802, 804, and 806 perform coexistence operations, and use the subframes allocated by eNB 850 to upload data to network 860 using the allocated subframes. In some embodiments, eNB 850 comprises a single device. In other embodiments, eNB 850 or any other eNB described herein may be implemented in a cloud radio area network (C-RAN) structure, with one or more baseband processors in a first component device of the eNB and one or more antennas in one or more other devices coupled to the first component device. For example, in some such embodiments, a first component device having baseband processors is coupled to one or more second component devices each having one or more antennas, and each being connected to the first component device via a fiber optic connection or some other wired or wireless connection.

EXAMPLES

In various embodiments methods, apparatus, non-transitory media, computer program products, or other implementations may be presented as example embodiments in accordance with the descriptions provided above. Certain embodiments may include UE such as phones, tablets, mobile computers, or other such devices. Some embodiments may be integrated circuit components of such devices, such as circuits implementing media access control (MAC) and/or L1 processing on an integrated circuitry. In some embodiments, functionality may be on a single chip or multiple chips in an apparatus. Some such embodiments may further include transmit and receive circuitry on integrated or separate circuits, with antennas that are similarly integrated or separate structures of a device. Any such components or circuit elements may similarly apply to evolved node B embodiments described herein.

Example 1 is an apparatus of an evolved node B (eNB) comprising: memory; and control circuitry coupled to the memory and configured to: manage reception of a first uplink scheduling request from a first user equipment (UE); schedule, by the eNB, a plurality of uplink subframes on the unlicensed channel in response to the first uplink scheduling request; and initiate transmission of a first downlink subframe in response to the scheduling of the plurality of uplink subframes, wherein the first downlink subframe comprises one or more downlink control indicators (DCIs) allocating the plurality of uplink subframes to the first UE.

In Example 2, the subject matter of Example 1 optionally includes, wherein the first downlink subframe and the one or more DCIs comprises a plurality of DCIs.

In Example 3, the subject matter of Example 2 optionally includes, wherein a first DCI of the plurality of DCIs includes two or more uplink grants, wherein each uplink grant schedules a different uplink subframe of the plurality of uplink subframes.

In Example 4, the subject matter of any one or more of Examples 1-3 optionally include-3, wherein the first DCI is carried in an extended Physical Downlink Control Channel (EPDCCH) with the two or more UL grants transmitted to the first UE in a data region of the EPDCCH.

In Example 5, the subject matter of any one or more of Examples 1-4 optionally include-3, wherein each DCI of the plurality of DCIs comprises an identifier associated with a single corresponding uplink subframe of the plurality of uplink subframes.

In Example 6, the subject matter of Example 5 optionally includes, wherein scheduling information included in plurality of DCIs is transmitted to the first UE using a physical downlink control channel (PDCCH).

In Example 7, the subject matter of Example 6 optionally includes, wherein a control channel region of the PDCCH is extended to more than three orthogonal frequency division multiplexing (OFDM) symbols.

In Example 8, the subject matter of Example 7 optionally includes, wherein a Physical Control Format Indicator Channel (PCFICH) is modified to allow for the control channel region of the PDCCH as extended to more than three OFDM symbols.

In Example 9, the subject matter of any one or more of Examples 1-8 optionally include, wherein the one or more DCIs consists of a first DCI.

In Example 10, the subject matter of Example 9 optionally includes, wherein the first DCI is modified to have a larger size, with an additional field carrying information for multi-subframe scheduling with uplink grants for the plurality of uplink subframes.

In Example 11, the subject matter of Example 10 optionally includes, wherein the first DCI comprises a DCI format 0/4 modified to have the larger size, wherein the DCI format 0/4 comprises a cyclic redundancy check (CRC) scrambled with a cell radio network temporary identifier (C-RNTI).

In Example 12, the subject matter of any one or more of Examples 1-11 optionally include-3 or 9-11, wherein the CRC of the one or more DCIs are scrambled by a multi-subframe scheduling RNTI (MS-RNTI), which indicates a DCI type.

In Example 13, the subject matter of any one or more of Examples 1-12 optionally include-3 or 9-11, wherein the plurality of uplink subframes are associated with an adjustable delay between transmission of a first uplink subframe among the plurality of uplink subframes and a corresponding uplink grant for the uplink scheduling.

In Example 14, the subject matter of Example 13 optionally includes, wherein the adjustable delay is set using signaling from one or more signaling communications comprising L1/L2 signaling, RRC signaling, or higher layer system signaling.

In Example 15, the subject matter of any one or more of Examples 1-14 optionally include-3 or 9-11, wherein the instructions further cause the eNB to perform a listen before talk operation on the unlicensed channel prior to initiating transmission of the first downlink subframe containing the one or more DCIs for multi-subframe scheduling on the unlicensed channel.

In Example 16, the subject matter of any one or more of Examples 1-15 optionally include-3 or 9-11, wherein the one or more DCIs and the plurality of uplink subframes use different component carriers for cross-carrier scheduling.

In Example 17, the subject matter of any one or more of Examples 1-16 optionally include-3 or 9-11 wherein the DCIs are multiplexed in the time domain within the first subframe.

In Example 18, the subject matter of any one or more of Examples 1-17 optionally include-3 or 9-11 wherein the control circuitry is further configured to: receive, at the eNB, a plurality of uplink scheduling request from a plurality of UEs, the plurality of UEs comprising the first UE; schedule, by the eNB, a second plurality of uplink subframes on the unlicensed channel in response to the plurality of uplink scheduling request, the second plurality of uplink subframes comprising the plurality of uplink subframes; and initiate transmission of a plurality of downlink subframes in response to the scheduling of the second plurality of uplink subframes, wherein each downlink subframe comprises one or more DCIs allocating at least a portion of the second plurality of uplink subframes to a corresponding UE of the plurality of UEs.

In Example 19, the subject matter of any one or more of Examples 1-18 optionally include-3 or 9-11, further comprising: an antenna; receive circuitry coupled to the antenna and configured to receive the first scheduling request from the first UE via the antenna and communicate the first scheduling request to the control circuitry; and transmit circuitry configured to transmit the first subframe to the first UE via the antenna.

In Example 20, the subject matter of Example 19 optionally includes, wherein the receive circuitry receives the first scheduling request via the antenna on the unlicensed channel.

In Example 21, the subject matter of Example 20 optionally includes, wherein the receive circuitry receives the first scheduling request via the antenna on a licensed channel that is different than the unlicensed channel.

Example 22 is a computer readable medium comprising instructions that, when executed by one or more processors, configure an evolved node B (eNB) for communications using an unlicensed channel, the instructions to configure the eNB to: process one or more uplink scheduling requests from one or more user equipment (UE); schedule a plurality of uplink subframes on the unlicensed channel in response to the one or more uplink scheduling request; and initiate transmission of a first downlink subframe to at least a first UE of the one or more UE on a first unlicensed channel in response to the scheduling of the plurality of uplink subframes, wherein the first downlink subframe comprises one or more downlink control indicators (DCIs) allocating the plurality of uplink subframes to the one or more UE.

In Example 23, the subject matter of Example 22 optionally includes, wherein the plurality of uplink subframes are associated with a fixed delay between transmission of a first uplink subframe among the plurality of uplink subframes and a corresponding uplink grant from the first downlink subframe.

In Example 24, the subject matter of Example 23 optionally includes, wherein the fixed delay is at least 4 milliseconds.

In Example 25, the subject matter of any one or more of Examples 23-24 optionally include, wherein the fixed delay is less than 4 milliseconds.

In Example 26, the subject matter of Example 25 optionally includes, further comprising: an antenna; broadband circuitry coupled to the antenna and configured to receive the downlink subframe from the eNB via the antenna and communicate the downlink subframe to the circuitry and to transmit the first uplink scheduling request to the via the antenna.

Example 27 is an apparatus of an evolved node B (eNB) comprising: memory; means for processing uplink scheduling requests from one or more user equipment (UE); means for scheduling a plurality of uplink subframes on the unlicensed channel in response to the one or more uplink scheduling request; and means for transmitting the first downlink subframe to at least the one or more UE on at least a first unlicensed channel in response to the scheduling of the plurality of uplink subframes, wherein the first downlink subframe comprises one or more downlink control indicators (DCIs) allocating the plurality of uplink subframes to the one or more UE.

In Example 28, the subject matter of Example 27 optionally includes, wherein the first downlink subframe and the one or more DCIs comprises a plurality of DCIs; wherein a first DCI of the plurality of DCIs includes two or more uplink grants, wherein each uplink grant schedules a different uplink subframe of the plurality of uplink subframes; and wherein the first DCI is carried in an extended Physical Downlink Control Channel (EPDCCH) with the two or more UL, grants transmitted to the first UE in a data region of the EPDCCH.

In Example 29, the subject matter of any one or more of Examples 27-28 optionally include, wherein each DCI of the plurality of DCIs comprises an identifier associated with a single corresponding uplink subframe of the plurality of uplink subframes.

In Example 30, the subject matter of any one or more of Examples 27-29 optionally include wherein scheduling information included in plurality of DCIs is transmitted to the first UE using a physical downlink control channel (PDCCH).

In Example 31, the subject matter of Example 30 optionally includes further comprising: means for adjusting delay between transmission of a first uplink subframe among the plurality of uplink subframes and a corresponding uplink grant for the uplink scheduling.

In Example 32, the subject matter of Example 31 optionally includes, wherein the adjustable delay is set using signaling from one or more signaling communications comprising L1/L2 signaling, RRC signaling, or higher layer system signaling.

In Example 33, the subject matter of any one or more of Examples 27-32 optionally include further comprising means for performing a listen before talk operation on the unlicensed channel prior to initiating transmission of the first downlink subframe containing the one or more DCIs for multi-subframe scheduling on the unlicensed channel.

Example 34 is an apparatus of a user equipment (UE) comprising: means for requesting network access; means for initiating initiate transmission of a first uplink scheduling request to an evolved node B (eNB); means for processing a subframe from the eNB comprising one or more DCIs to identify a plurality of uplink subframes allocated in response to the request for network access; and means for initiating transmission of a set of uplink data using the plurality of uplink subframes.

In Example 35, the subject matter of any one or more of Examples 25-34 optionally include, further comprising: means for transmitting and receiving data across an air gap.

Example 36 is a method of signaling uplink (UL) scheduling information in unlicensed spectrum.

Example 37 is The method of any claim above wherein multiple UL subframes can be scheduled jointly via DCIs within a single DL subframe.

Example 38 is The method of any claim above wherein multiple UL subframes for any number of UE can be scheduled jointly via DCIs within a single downlink (DL) subframe.

Example 39 is The method of any claim above wherein a new DCI can be designed for the multi-subframe scheduling.

Example 40 is The method of any claim above wherein additional fields to carry the indication of which UL subframes to be scheduled by the DCI can be added.

Example 41 is The method of any claim above wherein a new RNTI, called an MS-RNTI, is used to indicated a new DCI format.

Example 42 is The method of any claim above wherein an existing C-RNTI is re-used for scrambling the CRC, and the DCI differentiation can be based on a number of bits contained in the DCI.

In Example 43, the subject matter of Example undefined optionally includes/4 to indicate the possible different configurations for different subframes within the set of subframes that are scheduled jointly via the same DCI.

Example 44 is The method of any claim above wherein multiple DCIs, each of which may either include the scheduling information for a single or multiple UL subframes, are multiplexed within a single DL subframe 45. A method or apparatus of any claim above wherein the one or more DCIs and the plurality of uplink subframes use different component carriers for cross-carrier scheduling.

Example 45 is a method or apparatus of any claim above wherein the DCIs are multiplexed in the time domain within the first subframe.

Example 46 is a method of any claim above wherein the existing control channel region for PDCCH (i.e., the first three OFDM symbols) can be used for the DCI transmission.

Example 47 is The method of any claim above wherein the existing control channel region for PDCCH is extended.

In Example 48, the subject matter of Example 47 optionally includes wherein the control channel region is extended to four options, and existing PCFICH is re-used for the control channel region indication by exploiting the reserved CFI value to indicate the additional control region option.

In Example 49, the subject matter of Example undefined optionally includes bits) by modifying the code rate if needed, or the codeword length of PCFICH can be extended and more REs need to be allocated for PCFICH transmission.

Example 50 is The method of any claims above wherein the DCI can be carried in EPDCCH which is transmitted in the data region.

Example 51 is The method of any claims above wherein the delay between the DCI transmission and the scheduled subframes can be modified.

In Example 52, the subject matter of any one or more of Examples 4-51 optionally include ms to values less than 4 ms.

Example 53, the subject matter of Example undefined optionally includes/L2 signaling, RRC signaling, or any other higher layer signaling.

Example 54 is an apparatus of a user equipment (UE) comprising: circuitry configured to: identify a request for network access; initiate transmission of a first uplink scheduling request to an evolved node B (eNB); process a subframe from the eNB comprising one or more DCIs to identify a plurality of uplink subframes allocated in response to the request for network access; and initiate transmission of a set of uplink data using the plurality of uplink subframes.

Further, in addition to the specific combinations of examples described above, any of the examples detailing further implementations of an element of an apparatus or medium may be applied to any other corresponding apparatus or medium, or may be implemented in conjunction with another apparatus or medium. Thus, each example above may be combined with each other example in various ways both as implementations in a system and as combinations of elements to generate an embodiment from the combination of each example or group of examples. For example, any embodiment above describing a transmitting device will have an embodiment that receives the transmission, even if such an embodiment is not specifically detailed. Similarly, methods, apparatus examples, and computer readable medium examples may each have a corresponding example of the other type even if such examples for every embodiment are not specifically detailed.

Example Systems and Devices

Figure 9:
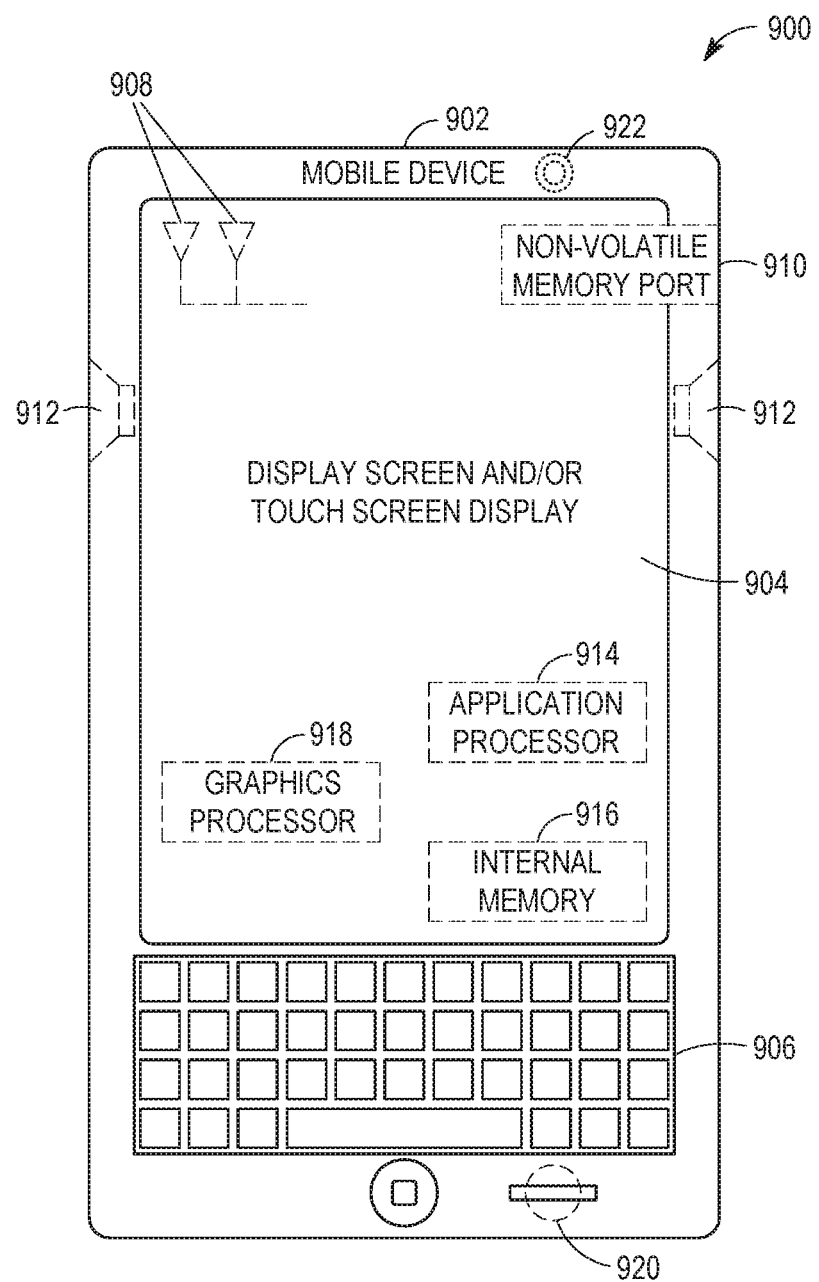
FIG. 9 illustrates aspects of a UE, in accordance with some example embodiments.

FIG. 9 shows an example UE, illustrated as a UE 900. The UE 900 may be an implementation of the UE 101, the eNB 150, or any device described herein. The UE 900 can include one or more antennas 908 configured to communicate with a transmission station, such as a base station (BS), an eNB 150, or another type of wireless wide area network (WWAN) access point. The UE 900 can be configured to communicate using at least one wireless communication standard including 3GPP LTE, WiMAX, High Speed Packet Access (HSPA), Bluetooth, and WiFi. The UE 900 can communicate using separate antennas 908 for each wireless communication standard or shared antennas 908 for multiple wireless communication standards. The UE 900 can communicate in a wireless local area network (WLAN), a wireless personal area network (WPAN), and/or a wireless wide area network (WWAN).

FIG. 9 also shows a microphone 920 and one or more speakers 912 that can be used for audio input and output to and from the UE 900. A display screen 904 can be a liquid crystal display (LCD) screen, or another type of display screen such as an organic light emitting diode (OLED) display. The display screen 904 can be configured as a touch screen. The touch screen can use capacitive, resistive, or another type of touch screen technology. An application processor 914 and a graphics processor 918 can be coupled to an internal memory 916 to provide processing and display capabilities. A non-volatile memory port 910 can also be used to provide data I/O options to a user. The non-volatile memory port 910 can also be used to expand the memory capabilities of the UE 900. A keyboard 906 can be integrated with the UE 900 or wirelessly connected to the UE 900 to provide additional user input. A virtual keyboard can also be provided using the touch screen. A camera 922 located on the front (display screen 904) side or the rear side of the UE 900 can also be integrated into the housing 902 of the UE 900.

Figure 10:
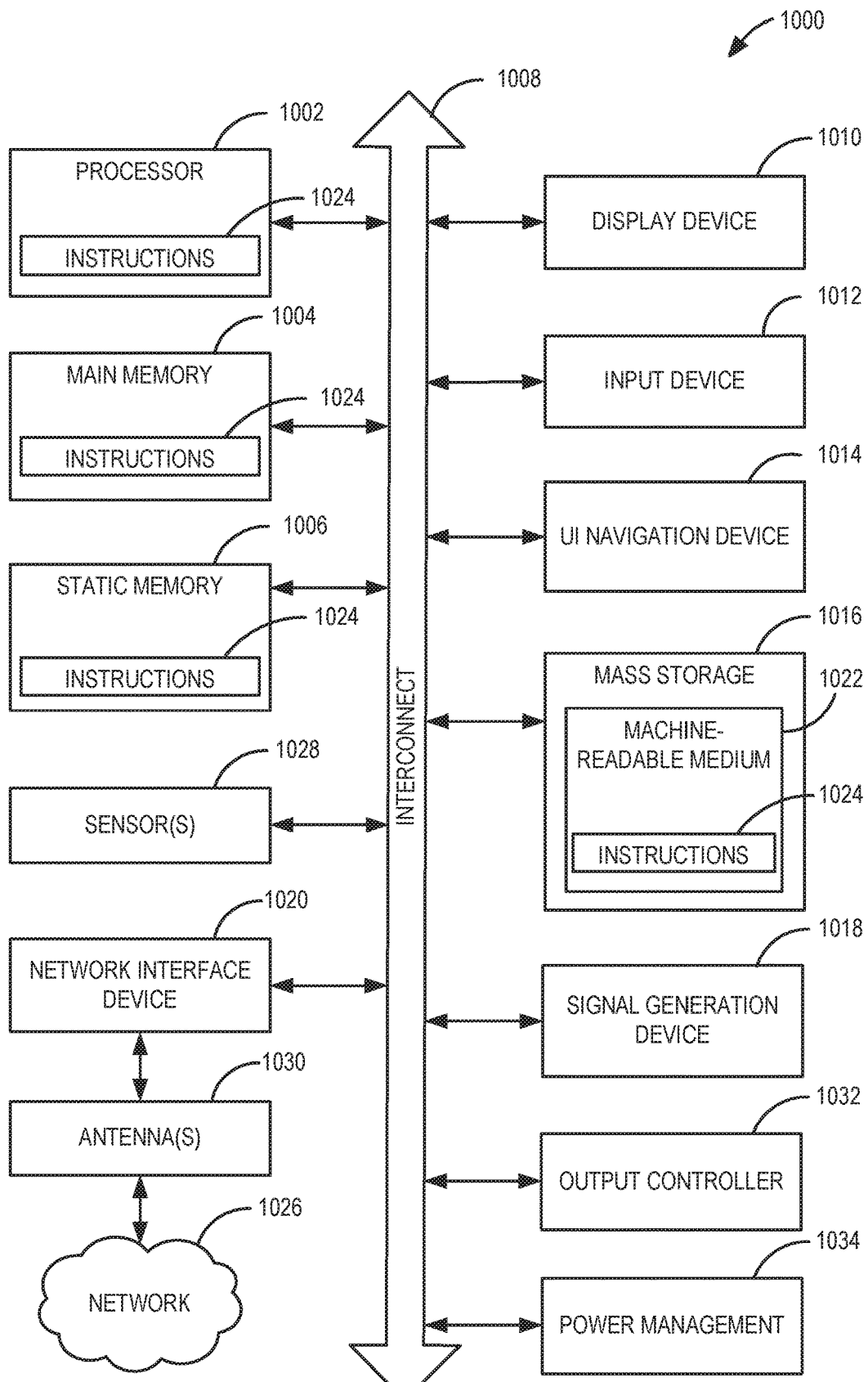
FIG. 10 is a block diagram illustrating an example computer system machine which may be used in association with various embodiments described herein.

FIG. 10 is a block diagram illustrating an example computer system machine 1000 upon which any one or more of the methodologies herein discussed can be run, and which may be used to implement the eNB 150, the UE 101, or any other device described herein. In various alternative embodiments, the machine operates as a standalone device or can be connected (e.g., networked) to other machines. In a networked deployment, the machine 1000 can operate in the capacity of either a server or a client machine in server-client network environments, or it can act as a peer machine in peer-to-peer (or distributed) network environments. The machine 1000 can be a personal computer (PC) that may or may not be portable (e.g., a notebook or a netbook), a tablet, a set-top box (STB), a gaming console, a personal digital assistant (PDA), a mobile telephone or smartphone, a web appliance, a network router, switch, or bridge, or any machine capable of executing instructions (sequential or otherwise) that specify actions to be taken by that machine. Further, while only a single machine 1000 is illustrated, the term "machine" shall also be taken to include any collection of machines that individually or jointly execute a set (or multiple sets) of instructions to perform any one or more of the methodologies discussed herein.

The example computer system machine 1000 includes a processor 1002 (e.g., a central processing unit (CPU), a graphics processing unit (GPU), or both), a main memory 1004, and a static memory 1006, which communicate with each other via an interconnect 1008 (e.g., a link, a bus, etc.). The computer system machine 1000 can further include a video display unit 1010, an alphanumeric input device 1012 (e.g., a keyboard 906), and a user interface (UI) navigation device 1014 (e.g., a mouse). In one embodiment, the video display device 1010, input device 1012, and UI navigation device 1014 are a touch screen display. The computer system machine 1000 can additionally include a mass storage device 1016 (e.g., a drive unit), a signal generation device 1018 (e.g., a speaker), an output controller 1032, a power management controller 1034, a network interface device 1020 (which can include or operably communicate with one or more antennas 1030, transceivers, or other wireless communications hardware), and one or more sensors 1028, such as a GPS sensor, compass, location sensor, accelerometer, or other sensor.

The storage device 1016 includes a machine-readable medium 1022 on which is stored one or more sets of data structures and instructions 1024 (e.g., software) embodying or utilized by any one or more of the methodologies or functions described herein. The instructions 1024 can also reside, completely or at least partially, within the main memory 1004, static memory 1006, and/or processor 1002 during execution thereof by the computer system machine 1000, with the main memory 1004, the static memory 1006, and the processor 1002 also constituting machine-readable media 1022.

While the machine-readable medium 1022 is illustrated, in an example embodiment, to be a single medium, the term "machine-readable medium" can include a single medium or multiple media (e.g., a centralized or distributed database, and/or associated caches and servers) that store the one or more instructions 1024. The term "machine-readable medium" shall also be taken to include any tangible medium that is capable of storing, encoding, or carrying instructions 1024 for execution by the machine 1000 and that cause the machine 1000 to perform any one or more of the methodologies of the present disclosure, or that is capable of storing, encoding, or carrying data structures utilized by or associated with such instructions 1024.

The instructions 1024 can further be transmitted or received over a communications network 1026 using a transmission medium via the network interface device 1020 utilizing any one of a number of well-known transfer protocols (e.g., hypertext transfer protocol (HTTP)). The term "transmission medium" shall be taken to include any medium that is capable of storing, encoding, or carrying instructions 1024 for execution by the machine 1000, and includes digital or analog communications signals or other intangible media to facilitate communication of such software.

Various techniques, or certain aspects or portions thereof, may take the form of program code (i.e., instructions 1024) embodied in tangible media, such as floppy diskettes, CD-ROMs, hard drives, non-transitory computer readable storage media, or any other machine-readable storage medium 1022 wherein, when the program code is loaded into and executed by a machine 1000, such as a computer, the machine 1000 becomes an apparatus for practicing the various techniques. In the case of program code execution on programmable computers, the computing device may include a processor 1002, a storage medium readable by the processor 1002 (including volatile and non-volatile memory and/or storage elements), at least one input device 1012, and at least one output device. The volatile and non-volatile memory and/or storage elements may be a random access memory (RAM), erasable programmable read-only memory (EPROM), flash drive, optical drive, magnetic hard drive, or other medium for storing electronic data. The base station and mobile station may also include a transceiver module, a counter module, a processing module, and/or a clock module or timer module. One or more programs that may implement or utilize the various techniques described herein may use an application program interface (API), reusable controls and the like. Such programs may be implemented in a high level procedural or object-oriented programming language to communicate with a computer system. However, the program(s) may be implemented in assembly or machine language, if desired. In any case, the language may be a compiled or interpreted language, and combined with hardware implementations.

Various embodiments may use 3GPP LTE/LTE-A, Institute of Electrical and Electronic Engineers (IEEE) 1002.11, and Bluetooth communication standards. Various alternative embodiments may use a variety of other WWAN, WLAN, and WPAN protocols and standards in connection with the techniques described herein. These standards include, but are not limited to, other standards from 3GPP (e.g., HSPA+, UMTS), IEEE 1002.16 (e.g., 1002.16p), or Bluetooth (e.g., Bluetooth 9.0, or like standards defined by the Bluetooth Special Interest Group) standards families. Other applicable network configurations can be included within the scope of the presently described communication networks 1026. It will be understood that communications on such communication networks 1026 can be facilitated using any number of networks, using any combination of wired or wireless transmission mediums.

Figure 11:
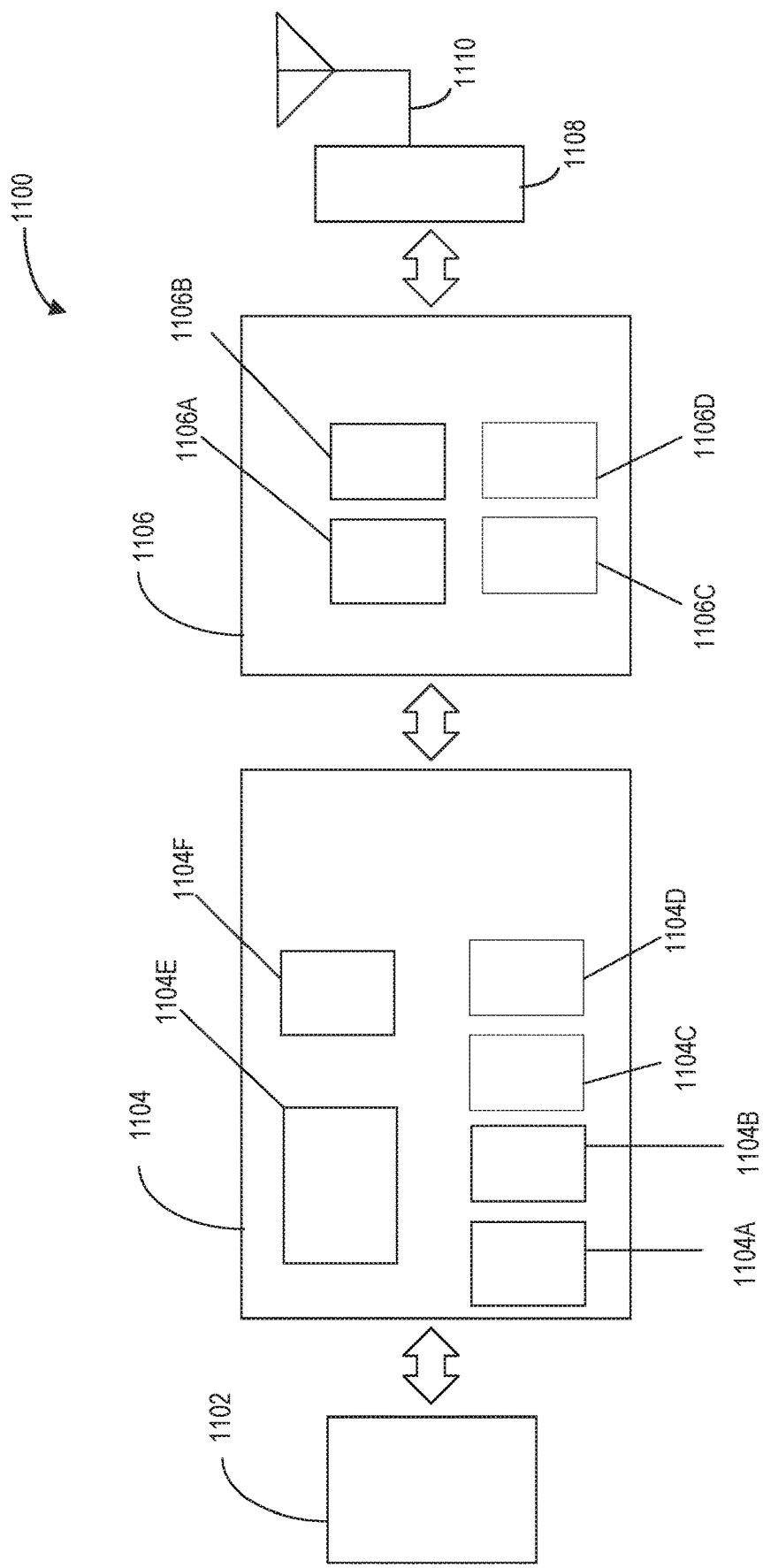
FIG. 11 illustrates aspects of a system for multi-subframe uplink scheduling, according to some embodiments.

FIG. 11 illustrates, for one embodiment, example components of a UE device 1100, in accordance with some embodiments. In some embodiments, the UE device 1100 may include application circuitry 1102, baseband circuitry 1104, RF circuitry 1106, front end module (FEM) circuitry 1108, and one or more antennas 1110, coupled together at least as shown. In some embodiments, the UE device 1100 may include additional elements such as, for example, memory/storage, display, camera, sensor, and/or I/O interface.

The application circuitry 1102 may include one or more application processors. For example, the application circuitry 1102 may include circuitry such as, but not limited to, one or more single-core or multi-core processors. The processor(s) may include any combination of general-purpose processors and dedicated processors (e.g., graphics processors, application processors, etc). The processors may be coupled with and/or may include memory/storage and may be configured to execute instructions stored in the memory/storage to enable various applications and/or operating systems to run on the system.

The baseband circuitry 1104 may include circuitry such as, but not limited to, one or more single-core or multi-core processors. The baseband circuitry 1104 may include one or more baseband processors and/or control logic to process baseband signals received from a receive signal path of the RF circuitry 1106 and to generate baseband signals for a transmit signal path of the RF circuitry 1106. Baseband circuitry 1104 may interface with the application circuitry 1102 for generation and processing of the baseband signals and for controlling operations of the RF circuitry 1106. For example, in some embodiments, the baseband circuitry 1104 may include a second generation (2G) baseband processor 1104a, third generation (3G) baseband processor 1104b fourth generation (4G) baseband processor 1104c, and/or other baseband processor(s) 1104d for other existing generations, generations in development or to be developed in the future (e.g., fifth generation (5G), 6G, etc.). The baseband circuitry 1104 (e.g., one or more of baseband processors 1104*a-d*) may handle various radio control functions that enable communication with one or more radio networks via the RF circuitry 1106. The radio control functions may include, but are not limited to, signal modulation/demodulation, encoding/decoding, radio frequency shifting, and the like. In some embodiments, modulation/demodulation circuitry of the baseband circuitry 1104 may include fast-fourier transform (FFT), precoding, and/or constellation mapping/demapping functionality. In some embodiments, encoding/decoding circuitry of the baseband circuitry 1104 may include convolution, tail-biting convolution, turbo, Viterbi, and/or low density parity check (LDPC) encoder/decoder functionality. Embodiments of modulation/demodulation and encoder/decoder functionality are not limited to these examples and may include other suitable functionality in other embodiments.

In some embodiments, the baseband circuitry 1104 may include elements of a protocol stack such as, for example, elements of an EUTRAN protocol including, for example, physical (PHY), media access control (MAC), radio link control (RLC), packet data convergence protocol (PDCP), and/or RRC elements. A central processing unit (CPU) 1104*e* of the baseband circuitry 1104 may be configured to run elements of the protocol stack for signaling of the PHY, MAC, RLC, PDCP and/or RRC layers. In some embodiments, the baseband circuitry 1104 may include one or more audio digital signal processor(s) (DSP) 1104*f*. The audio DSP(s) 1104*f* may be include elements for compression/decompression and echo cancellation and may include other suitable processing elements in other embodiments. Components of the baseband circuitry 1104 may be suitably combined in a single chip, a single chipset, or disposed on a same circuit board in some embodiments. In some embodiments, some or all of the constituent components of the baseband circuitry 1104 and the application circuitry 1102 may be implemented together such as, for example, on a system on chip (SOC) device.

In some embodiments, the baseband circuitry 1104 may provide for communication compatible with one or more radio technologies. For example, in some embodiments, the baseband circuitry 1104 may support communication with an evolved universal terrestrial radio access network (EUTRAN) and/or other WMAN, WLAN, or WPAN. Embodiments in which the baseband circuitry 1104 is configured to support radio communications of more than one wireless protocol may be referred to as multi-mode baseband circuitry.

RF circuitry 1106 may enable communication with wireless networks using modulated electromagnetic radiation through a non-solid medium. In various embodiments, the RF circuitry 1106 may include switches, filters, amplifiers, and the like to facilitate the communication with the wireless network. RF circuitry 1106 may include a receive signal path which may include circuitry to down-convert RF signals received from the FEM circuitry 1108 and provide baseband signals to the baseband circuitry 1104. RF circuitry 1106 may also include a transmit signal path which may include circuitry to up-convert baseband signals provided by the baseband circuitry 1104 and provide RF output signals to the FEM circuitry 1108 for transmission.

In some embodiments, the RF circuitry 1106 may include a receive signal path and a transmit signal path. The receive signal path of the RF circuitry 1106 may include mixer circuitry 1106*a*, amplifier circuitry 1106*b*, and filter circuitry 1106*c*. The transmit signal path of the RF circuitry 1106 may include filter circuitry 1106*c* and mixer circuitry 1106*a*. RF circuitry 1106 may also include synthesizer circuitry 1106*d* for synthesizing a frequency for use by the mixer circuitry 1106*a* of the receive signal path and the transmit signal path. In some embodiments, the mixer circuitry 1106*a* of the receive signal path may be configured to down-convert RF signals received from the FEM circuitry 1108 based on the synthesized frequency provided by synthesizer circuitry 1106*d*. The amplifier circuitry 1106*b* may be configured to amplify the down-converted signals, and the filter circuitry 1106*c* may be a low-pass filter (LPF) or band-pass filter (BPF) configured to remove unwanted signals from the down-converted signals to generate output baseband signals. Output baseband signals may be provided to the baseband circuitry 1104 for further processing. In some embodiments, the output baseband signals may be zero-frequency baseband signals, although this is not a requirement. In some embodiments, mixer circuitry 1106*a* of the receive signal path may comprise passive mixers, although the scope of the embodiments is not limited in this respect.

In some embodiments, the mixer circuitry 1106*a* of the transmit signal path may be configured to up-convert input baseband signals based on the synthesized frequency provided by the synthesizer circuitry 1106*d* to generate RF output signals for the FEM circuitry 1108. The baseband signals may be provided by the baseband circuitry 1104 and may be filtered by filter circuitry 1106*c*. The filter circuitry 1106*c* may include a LPF, although the scope of the embodiments is not limited in this respect.

In some embodiments, the mixer circuitry 1106*a* of the receive signal path and the mixer circuitry 1106*a* of the transmit signal path may include two or more mixers and may be arranged for quadrature down conversion and/or up conversion, respectively. In some embodiments, the mixer circuitry 1106*a* of the receive signal path and the mixer circuitry 1106*a* of the transmit signal path may include two or more mixers and may be arranged for image rejection (e.g., Hartley image rejection). In some embodiments, the mixer circuitry 1106*a* of the receive signal path and the mixer circuitry 1106*a* may be arranged for direct down conversion and/or direct up conversion, respectively. In some embodiments, the mixer circuitry 1106*a* of the receive signal path and the mixer circuitry 1106*a* of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 1106 may include analog-to-digital converter (ADC) and digital-to-analog converter (DAC) circuitry, and the baseband circuitry 1104 may include a digital baseband interface to communicate with the RF circuitry 1106.

In some dual-mode embodiments, separate circuitry including one or more integrated circuits may be provided for processing signals for each spectrum, although the scope of the embodiments is not limited in this respect. In some embodiments, the synthesizer circuitry 1106*d* may be a fractional-N synthesizer or a fractional N/N+1 synthesizer, although the scope of the embodiments is not limited in this respect as other types of frequency synthesizers may be suitable. For example, synthesizer circuitry 1106*d* may be a delta-sigma synthesizer, a frequency multiplier, or a synthesizer comprising a phase-locked loop with a frequency divider.

The synthesizer circuitry 1106*d* may be configured to synthesize an output frequency for use by the mixer circuitry

1106a of the RF circuitry 1106 based on a frequency input and a divider control input. In some embodiments, the synthesizer circuitry 1106d may be a fractional N/N+1 synthesizer.

In some embodiments, frequency input may be provided by a voltage controlled oscillator (VCO), although that is not a requirement. Divider control input may be provided by either the baseband circuitry 1104 or the applications processor 1102 depending on the desired output frequency. In some embodiments, a divider control input (e.g., N) may be determined from a look-up table based on a channel indicated by the applications processor 1102.

Synthesizer circuitry 1106d of the RF circuitry 1106 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump, and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 1106d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 1106 may include a polar converter.

FEM circuitry 1108 may include a receive signal path, which may include circuitry configured to operate on RF signals received from one or more antennas 1110, amplify the received signals, and provide the amplified versions of the received signals to the RF circuitry 1106 for further processing. FEM circuitry 1108 may also include a transmit signal path, which may include circuitry configured to amplify signals for transmission provided by the RF circuitry 1106 for transmission by one or more of the one or more antennas 1110.

In some embodiments, the FEM circuitry 1108 may include a TX/RX switch to switch between transmit mode and receive mode operation. The FEM circuitry 1108 may include a receive signal path and a transmit signal path. The receive signal path of the FEM circuitry 1108 may include a low-noise amplifier (LNA) to amplify received RF signals and provide the amplified received RF signals as an output (e.g., to the RF circuitry 1106). The transmit signal path of the HEM circuitry 1108 may include a power amplifier (PA) to amplify input RF signals (e.g., provided by RF circuitry 1106), and one or more filters to generate RF signals for subsequent transmission (e.g., by one or more of the one or more antennas 1110).

In some embodiments, the UE 1100 comprises a plurality of power saving mechanisms. If the UE 1100 is in an RRC_Connected state, where it is still connected to the eNB because it expects to receive traffic shortly, then it may enter a state known as discontinuous reception mode (DRX) after a period of inactivity. During this state, the device may power down for brief intervals of time and thus save power.

If there is no data traffic activity for an extended period of time, then the UE 1100 may transition off to an RRC_Idle state, where it disconnects from the network and does not perform operations such as channel quality feedback, handover, and the like. The UE 1100 goes into a very low power state and it performs paging where it periodically wakes up to listen to the network and then powers down again. The device cannot receive data in this state; in order to receive data, the device transitions back to an RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

The embodiments described above can be implemented in one or a combination of hardware, firmware, and software. Various methods or techniques, or certain aspects or portions thereof can take the form of program code (i.e., instructions) embodied in tangible media, such as flash memory, hard drives, portable storage devices, read-only memory (ROM), RAM, semiconductor memory devices (e.g., EPROM, Electrically Erasable Programmable Read-Only Memory (EEPROM)), magnetic disk storage media, optical storage media, and any other machine-readable storage medium or storage device wherein, when the program code is loaded into and executed by a machine, such as a computer or networking device, the machine becomes an apparatus for practicing the various techniques.

It should be understood that the functional units or capabilities described in this specification may have been referred to or labeled as components or modules in order to more particularly emphasize their implementation independence. For example, a component or module can be implemented as a hardware circuit comprising custom very-large-scale integration (VLSI) circuits or gate arrays, off-the-shelf semiconductors such as logic chips, transistors, or other discrete components. A component or module can also be implemented in programmable hardware devices such as field programmable gate arrays, programmable array logic, programmable logic devices, or the like. Components or modules can also be implemented in software for execution by various types of processors. An identified component or module of executable code can, for instance, comprise one or more physical or logical blocks of computer instructions, which can, for instance, be organized as an object, procedure, or function. Nevertheless, the executables of an identified component or module need not be physically located together, but can comprise disparate instructions stored in different locations which, when joined logically together, comprise the component or module and achieve the stated purpose for the component or module.

Indeed, a component or module of executable code can be a single instruction, or many instructions, and can even be distributed over several different code segments, among different programs, and across several memory devices. Similarly, operational data can be identified and illustrated herein within components or modules, and can be embodied in any suitable form and organized within any suitable type of data structure. The operational data can be collected as a single data set, or can be distributed over different locations including over different storage devices, and can exist, at least partially, merely as electronic signals on a system or network. The components or modules can be passive or active, including agents operable to perform desired functions.

What is claimed is:

1. A non-transitory computer readable medium comprising instructions that, when executed by one or more processors, configure a base station (BS), the instructions to configure the BS to:
   transmit a first downlink control indicator (DCI) to a first UE allocating a first plurality of uplink transmissions to the first UE, wherein the first DCI includes scheduling information for the uplink transmissions of the first plurality of uplink transmissions, wherein the first DCI includes added bits to carry respective configurations for different respective uplink transmissions of the first plurality of uplink transmissions, wherein the added bits include respective new data indicators and redundancy versions for the different respective uplink transmissions of the first plurality of uplink transmissions, wherein a number of bits of the first DCI is useable to identify a format of the first DCI from a second DCI format.

2. The non-transitory computer readable medium of claim 1, wherein the scheduling information is transmitted to the first UE using a physical downlink control channel (PDCCH), wherein a control channel region of the PDCCH is not limited to a first three orthogonal frequency division multiplexing (OFDM) symbols.

3. The non-transitory computer readable medium of claim 1, wherein the first plurality of uplink transmissions are associated with an adjustable delay between transmission of a first uplink transmission among the first plurality of uplink transmissions and the first DCI.

4. The non-transitory computer readable medium of claim 3, wherein the adjustable delay is set using signaling from one or more signaling communications comprising L1/L2 signaling, radio resource control (RRC) signaling, or higher layer system signaling.

5. The non-transitory computer readable medium of claim 1, wherein the instructions further configure the BS to:
   receive, at the BS, a plurality of uplink scheduling requests from a plurality of UEs, the plurality of UEs comprising the first UE;
   schedule, by the BS, a second plurality of uplink transmissions in response to the plurality of uplink scheduling requests, the second plurality of uplink transmissions comprising the first plurality of uplink transmissions; and
   initiate transmission of a plurality of downlink subframes in response to the scheduling of the second plurality of uplink transmissions, wherein each downlink subframe comprises one or more DCIs allocating at least a portion of the second plurality of uplink transmissions to a corresponding UE of the plurality of UEs, and wherein each downlink subframe is associated with a different corresponding UE of the plurality of UEs.

6. An apparatus, comprising:
   a processor configured to cause a base station (BS) to:
   transmit, on a first channel, a first downlink control indicator (DCI) allocating a first plurality of uplink transmissions to a first user equipment (UE),
   wherein the first DCI includes scheduling information for the uplink transmissions of the first plurality of uplink transmissions on the first channel, wherein the first DCI includes added bits to carry different configurations for different uplink transmissions of the first plurality of uplink transmissions on the first channel, wherein the added bits include respective new data indicators and redundancy versions for respective uplink transmissions of the first plurality of uplink transmissions on the first channel, wherein a number of bits of the first DCI is useable to identify a format of the first DCI from a second DCI format.

7. The apparatus of claim 6, wherein the processor is further configured to cause the BS to perform a listen before talk operation on the first channel prior to initiating transmission of the first DCI, wherein the first DCI is configured for multi-subframe scheduling on the first channel.

8. The apparatus of claim 6, wherein the first DCI and the first plurality of uplink transmissions use different component carriers for cross-carrier scheduling.

9. The apparatus of claim 6, wherein the first DCI is multiplexed in a time domain within a first downlink subframe.

10. The apparatus of claim 6, wherein the first DCI comprises a plurality of subframe identifiers, wherein respective subframe identifiers of the plurality of subframe identifiers are associated with respective single corresponding uplink transmissions of the first plurality of uplink transmissions;
    wherein the first DCI is transmitted to the first UE using a physical downlink control channel (PDCCH); and
    wherein a control channel region of the PDCCH is extended to more than three orthogonal frequency division multiplexing (OFDM) symbols.

11. The apparatus of claim 6, wherein the first DCI comprises a plurality of subframe identifiers, wherein respective subframe identifiers of the plurality of subframe identifiers indicate respective single corresponding uplink transmissions of the first plurality of uplink transmissions.

12. The apparatus of claim 11, wherein the plurality of subframe identifiers are included in an additional field, wherein the additional field is in addition to a base DCI size associated with a DCI format 0 or 4.

13. The apparatus of claim 6, wherein the first channel comprises shared bandwidth.

14. An apparatus, comprising:
    a processor configured to cause a user equipment (UE) to:
    receive, from a base station (BS), a first downlink control indicator (DCI) to identify a first plurality of uplink transmissions, wherein the first DCI includes scheduling information for the uplink transmissions of the first plurality of uplink transmissions, wherein the first DCI includes added bits to carry different configurations for different uplink transmissions of the first plurality of uplink transmissions on a first channel, wherein the added bits include new data indicators and redundancy versions for the different uplink transmissions of the first plurality of uplink transmissions, wherein a number of bits of the first DCI is useable to identify a format of the first DCI from a second DCI format; and
    initiate transmission of a set of uplink data using the first plurality of uplink transmissions.

15. The apparatus of claim 14, further comprising:
    an antenna; and
    broadband circuitry coupled to the antenna and configured to:
    receive the DCI from the BS via the antenna; and
    communicate the DCI to the processor.

16. The apparatus of claim 14, wherein the first DCI comprises a DCI format 0 or 4, wherein the DCI format 0 or 4 comprises a cyclic redundancy check (CRC) scrambled with a cell radio network temporary identifier (C-RNTI).

17. The apparatus of claim 16, wherein the CRC of the first DCI is scrambled by a multi-subframe scheduling radio network temporary identifier (MS-RNTI).

18. The apparatus of claim 14, wherein the first DCI comprises a plurality of subframe identifiers, wherein respective subframe identifiers of the plurality of subframe identifiers indicate respective single corresponding uplink transmissions of the first plurality of uplink transmissions.

19. The apparatus of claim 18, wherein the plurality of subframe identifiers are included in an additional field, wherein the additional field is in addition to a base DCI size associated with a DCI format 0 or 4.

20. A base station (BS), comprising:
a radio; and
a processor operably connected to the radio and configured to cause the base station to:
transmit a first downlink control indicator (DCI) to a first UE allocating a first plurality of uplink transmissions on a first channel to the first UE, wherein the first DCI includes scheduling information for the uplink transmissions of the first plurality of uplink transmissions on the first channel, wherein the first DCI includes added bits to carry different configurations for different uplink transmissions of the first plurality of uplink transmissions on the first channel, wherein the added bits include respective new data indicators and redundancy versions for the different uplink transmissions of the first plurality of uplink transmissions on the first channel, wherein a number of bits of the first DCI is useable to identify a format of the first DCI from a second DCI format.

21. The base station of claim 20, wherein the DCI is appended with a 16 bit cyclic redundancy check (CRC).

22. The base station of claim 20, wherein the added bits are added to an existing DCI format to enable physical uplink shared channel (PUSCH) scheduling by a single DCI.

23. The base station of claim 20, wherein the first plurality of uplink transmissions are consecutive uplink transmissions.

24. The base station of claim 23, wherein the consecutive uplink transmissions do include gaps for listen before talk (LBT) procedures between the consecutive uplink transmissions.

25. The base station of claim 20, wherein the DCI indicates which subframes are scheduled by the DCI.

* * * * *